(12) United States Patent
Wang et al.

(10) Patent No.: US 11,842,019 B2
(45) Date of Patent: *Dec. 12, 2023

(54) TOUCH SUBSTRATE AND DISPLAY PANEL

(71) Applicants: Chengdu BOE Optoelectronics Technology Co., Ltd., Chengdu (CN); BOE TECHNOLOGY GROUP CO., LTD., Beijing (CN)

(72) Inventors: Yu Wang, Beijing (CN); Yi Zhang, Beijing (CN); Shun Zhang, Beijing (CN); Ping Wen, Beijing (CN); Yuanqi Zhang, Beijing (CN); Wei Wang, Beijing (CN); Fuqiang Yang, Beijing (CN); Yang Zeng, Beijing (CN); Chang Luo, Beijing (CN); Chao Zeng, Beijing (CN)

(73) Assignees: Chengdu BOE Optoelectronics Technology Co., Ltd., Chengdu (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/792,213

(22) PCT Filed: Sep. 3, 2021

(86) PCT No.: PCT/CN2021/116435
§ 371 (c)(1),
(2) Date: Jul. 12, 2022

(87) PCT Pub. No.: WO2022/062879
PCT Pub. Date: Mar. 31, 2022

(65) Prior Publication Data
US 2023/0049317 A1  Feb. 16, 2023

(30) Foreign Application Priority Data

Sep. 27, 2020 (WO) ................ PCT/CN2020/118087

(51) Int. Cl.
*G06F 3/044* (2006.01)

(52) U.S. Cl.
CPC .......... *G06F 3/0446* (2019.05); *G06F 3/0443* (2019.05); *G06F 3/0448* (2019.05);
(Continued)

(58) Field of Classification Search
None
See application file for complete search history.

(56) References Cited

U.S. PATENT DOCUMENTS 10,915,211 B2   2/2021   Zhang
11,068,092 B2   7/2021   Han et al.
(Continued)

FOREIGN PATENT DOCUMENTS

CN   108984013 A   12/2018
CN   109213372 A   1/2019
(Continued)

OTHER PUBLICATIONS

International Search Report in PCT/CN2021/116435 dated Nov. 23, 2021 in English.
(Continued)

*Primary Examiner* — Duane N Taylor, Jr.
(74) *Attorney, Agent, or Firm* — Collard & Roe, P.C.

(57) ABSTRACT

A touch substrate and a display panel are provided. The touch substrate includes first touch electrodes and second touch electrodes; the first touch electrodes are arranged along a first direction and extend along a second direction, and the second touch electrodes are arranged along the second direction and extend along the first direction; each first touch electrode includes a first touch sub-electrode and a first connection electrode, the first connection electrode is between two adjacent first touch sub-electrodes, the two adjacent first touch sub-electrodes are electrically connected
(Continued)

through the first connection electrode; the first touch sub-electrode and the first connection electrode are in different conductive layers; the first touch sub-electrode is at least partially in the first functional region of the touch substrate and outside the opening peripheral region, the first connection electrode includes a first connection sub-electrode that is at least partially in the opening peripheral region.

20 Claims, 8 Drawing Sheets

(52) U.S. Cl.
CPC .............. *G06F 2203/04104* (2013.01); *G06F 2203/04107* (2013.01); *G06F 2203/04111* (2013.01); *G06F 2203/04112* (2013.01)

(56) References Cited

U.S. PATENT DOCUMENTS

| | | | |
|---|---|---|---|
| 11,249,608 B2 | 2/2022 | Xu et al. | |
| 11,334,184 B2 | 5/2022 | Ye | |
| 11,442,587 B2* | 9/2022 | Song | G06F 3/0448 |
| 11,604,553 B2* | 3/2023 | Song | G06F 3/0448 |
| 11,693,522 B2 | 7/2023 | Jun et al. | |
| 2019/0079622 A1 | 3/2019 | Choi et al. | |
| 2020/0064968 A1* | 2/2020 | Kim | G06F 3/0448 |
| 2020/0098847 A1 | 3/2020 | Zhang et al. | |
| 2020/0142525 A1 | 5/2020 | Han et al. | |
| 2020/0183538 A1 | 6/2020 | Li et al. | |
| 2021/0357079 A1* | 11/2021 | Song | G06F 3/0412 |
| 2021/0397320 A1 | 12/2021 | Ye | |
| 2022/0190043 A1 | 6/2022 | Ge | |
| 2022/0253177 A1 | 8/2022 | Fan et al. | |
| 2022/0350446 A1 | 11/2022 | Song et al. | |
| 2022/0384533 A1 | 12/2022 | Jang et al. | |

FOREIGN PATENT DOCUMENTS

| | | | | |
|---|---|---|---|---|
| CN | 109360837 A | | 2/2019 | |
| CN | 109388288 A | | 2/2019 | |
| CN | 109545085 A | | 3/2019 | |
| CN | 110007804 A | * | 7/2019 | ........... G06F 1/1643 |
| CN | 110007804 A | | 7/2019 | |
| CN | 110837314 A | | 2/2020 | |
| CN | 110874160 A | | 3/2020 | |
| CN | 110968220 A | | 4/2020 | |
| CN | 111158514 A | | 5/2020 | |
| CN | 111538443 A | | 8/2020 | |
| CN | 111708461 A | | 9/2020 | |
| WO | 2020/080740 A1 | | 4/2020 | |

OTHER PUBLICATIONS

Written Opinion in PCT/CN2021/116435 dated Nov. 23, 2021 in Chinese.
Chinese Office Action in Chinese Application No. 202180002458.9 dated May 27, 2023 with English translation.
U.S. Office Action in U.S. Appl. No. 17/789,581 dated Jul. 26, 2023.
U.S. Office Action in U.S. Appl. No. 17/419,679 dated Jun. 5, 2023.

* cited by examiner

TOUCH SUBSTRATE AND DISPLAY PANEL

CROSS-REFERENCE

This application is the National Stage of PCT/CN2021/116435, filed on Sep. 3, 2021, which claims priority of PCT international application No. PCT/CN2020/118087, filed on Sep. 27, 2020, the entire contents of which are incorporated herein by reference as part of the present application.

TECHNICAL FIELD

Embodiments of the present disclosure relate to a touch substrate and a display panel.

BACKGROUND

The user interface with a touch function is widely used in various electronic devices, for example in display products such as display panels or display apparatuses. At the same time, with the continuous increasing of users' demand for visual effects of the display product, narrow frame or even full-screen display has become a new trend in the development of organic light emitting diode (OLED) display products.

SUMMARY

At least one embodiment of the present disclosure provides a touch substrate, the touch substrate comprises: a base substrate and a plurality of first touch electrodes and a plurality of second touch electrodes on the base substrate, the plurality of first touch electrodes are arranged along a first direction, and each of the plurality of first touch electrodes extends along a second direction different from the first direction, the plurality of second touch electrodes are arranged along the second direction, and each of the plurality of second touch electrodes extends along the first direction; each of the plurality of first touch electrodes comprises a plurality of first touch sub-electrodes and at least one first connection electrode, the plurality of first touch sub-electrodes are arranged along the second direction, and each first connection electrode is between two adjacent first touch sub-electrodes that are adjacent in the second direction, so that the two adjacent first touch sub-electrodes are electrically connected through the first connection electrode, the first touch sub-electrode and the first connection electrode are respectively in different conductive layers relative to the base substrate; the touch substrate comprises a first functional region and a peripheral region at least partially surrounding the first functional region, the first functional region comprises an opening, and the peripheral region comprises an opening peripheral region located at least partially in the opening; the plurality of first touch sub-electrodes are at least partially located in the first functional region and outside the opening peripheral region, the at least one first connection electrode comprises a first connection sub-electrode, and the first connection sub-electrode is at least partially in the opening peripheral region.

For example, the touch substrate provided by an embodiment of the present disclosure further comprises a first conductive layer, an insulating layer, and a second conductive layer, the first conductive layer, the insulating layer, and the second conductive layer are on the base substrate and are stacked with each other; the insulating layer is between the first conductive layer and the second conductive layer, and the first conductive layer and the second conductive layer are spaced apart and insulated from each other in a direction perpendicular to the base substrate through the insulating layer; the plurality of first touch sub-electrodes are in the first conductive layer, and the at least one first connection electrode is at least partially in the second conductive layer, and the first touch sub-electrode and the first connection electrode are electrically connected through a hole structure at least penetrating the insulating layer.

For example, in the touch substrate provided by an embodiment of the present disclosure, the at least one first connection electrode further comprises a second connection sub-electrode, the second connection sub-electrode is in the first functional region, and the second connection sub-electrode is in the second conductive layer.

For example, in the touch substrate provided by an embodiment of the present disclosure, an area of a region enclosed by an orthographic projection of the first connection sub-electrode on the base substrate is substantially equal to an area of a region enclosed by an orthographic projection of the second connection sub-electrode on the base substrate.

For example, in the touch substrate provided by an embodiment of the present disclosure, the first connection sub-electrode is in the second conductive layer, and the first connection sub-electrode and the first touch sub-electrode at least partially overlap in the direction perpendicular to the base substrate, so that the first connection sub-electrode and the first touch sub-electrode are electrically connected through the hole structure; the second connection sub-electrode and the first touch sub-electrode at least partially overlap in the direction perpendicular to the base substrate, so that the second connection sub-electrode and the first touch sub-electrode are electrically connected through the hole structure; an area of an overlapping portion between the first connection sub-electrode and the first touch sub-electrode is substantially equal to an area of an overlapping portion between the second connection sub-electrode and the first touch sub-electrode.

For example, in the touch substrate provided by an embodiment of the present disclosure, the first connection sub-electrode is electrically connected with the first touch sub-electrode at a first position of the first touch sub-electrode through the hole structure, the second connection sub-electrode is electrically connected with the first touch sub-electrode at a second position of the first touch sub-electrode through the hole structure, and a relative position of the first position in the first touch sub-electrode is substantially consistent with a relative position of the second position in the first touch sub-electrode.

For example, in the touch substrate provided by an embodiment of the present disclosure, the first connection sub-electrode comprises a first conducting sub-portion and a second conducting sub-portion spaced apart from each other, the first conducting sub-portion and the second conducting sub-portion are arranged between the two adjacent first touch sub-electrodes and along the first direction, and are electrically connected with the two adjacent first touch sub-electrodes, and an area of a region enclosed by an orthographic projection of the first conducting sub-portion on the base substrate is substantially equal to an area of a region enclosed by an orthographic projection of the second conducting sub-portion on the base substrate.

For example, in the touch substrate provided by an embodiment of the present disclosure, the at least one first connection electrode further comprises a third connection sub-electrode, and the third connection sub-electrode is at least partially in the opening peripheral region, the touch substrate further comprises at least one compensation electrode, and the at least one compensation electrode is at least partially in the opening peripheral region, the compensation electrode is configured to be connected with one first touch sub-electrode adjacent to the compensation electrode, and the one first touch sub-electrode is electrically connected with a corresponding third connection sub-electrode through the compensation electrode.

For example, in the touch substrate provided by an embodiment of the present disclosure, the third connection sub-electrode is at least partially in the second conductive layer, and the compensation electrode is in the first conductive layer, the third connection sub-electrode and the compensation electrode at least partially overlap in the direction perpendicular to the base substrate, so that the third connection sub-electrode and the compensation electrode are electrically connected through the hole structure.

For example, in the touch substrate provided by an embodiment of the present disclosure, the second connection sub-electrode and the first touch sub-electrode at least partially overlap in the direction perpendicular to the base substrate, so that the second connection sub-electrode and the first touch sub-electrode are electrically connected through the hole structure; an area of an overlapping portion between the third connection sub-electrode and the compensation electrode is substantially equal to an area of an overlapping portion between the second connection sub-electrode and the first touch sub-electrode.

For example, in the touch substrate provided by an embodiment of the present disclosure, the third connection sub-electrode is further at least partially in the first conductive layer, and the third connection sub-electrode comprises at least one first connection sub-portion in the first conductive layer and a second connection sub-portion in the second conductive layer, the third connection sub-electrode is respectively electrically connected with two compensation electrodes, so as to be electrically connected with corresponding two first touch sub-electrodes through the two compensation electrodes, the at least one first connection sub-portion and one of the two compensation electrodes are directly connected with each other and continuously arranged in the first conductive layer, and the second connection sub-portion is electrically connected with the other one of the two compensation electrodes through the hole structure, the at least one first connection sub-portion and the second connection sub-portion are electrically connected through a first connection hole at least penetrating the insulating layer.

For example, in the touch substrate provided by an embodiment of the present disclosure, the compensation electrode extends along an edge direction of the opening; a width of the third connection sub-electrode in the first direction is less than or equal to a width of the compensation electrode in a direction perpendicular to an extension direction of the compensation electrode.

For example, in the touch substrate provided by an embodiment of the present disclosure, the at least one compensation electrode comprises a plurality of compensation electrodes, and the plurality of compensation electrodes are arranged along the edge direction of the opening.

For example, in the touch substrate provided by an embodiment of the present disclosure, each of the plurality of second touch electrodes comprises a plurality of second touch sub-electrodes and at least one second connection electrode, the plurality of second touch sub-electrodes are arranged along the first direction, and each second connection electrode is between two adjacent second touch sub-electrodes that are adjacent in the first direction, so that the two adjacent second touch sub-electrodes are electrically connected through the second connection electrode, and the plurality of second touch sub-electrodes and the at least one second connection electrode are in the first conductive layer.

For example, in the touch substrate provided by an embodiment of the present disclosure, each of the plurality of second touch electrodes further comprises a third touch sub-electrode, the third touch sub-electrode is at least partially in the opening peripheral region, and is arranged along the edge direction of the opening, second touch sub-electrodes and/or second connection electrodes that are respectively on two sides of the opening in the first direction are electrically connected through the third touch sub-electrode.

For example, in the touch substrate provided by an embodiment of the present disclosure, the third touch sub-electrode is at least partially on a side of the compensation electrode away from the first functional region.

For example, in the touch substrate provided by an embodiment of the present disclosure, the compensation electrode has a notch on a side away from the opening, the third touch sub-electrode is at least partially in the notch, or the first connection sub-electrode is at least partially in the notch.

For example, in the touch substrate provided by an embodiment of the present disclosure, the third touch sub-electrode comprises a plurality of first connection portions and a plurality of second connection portions, the plurality of first connection portions are arranged at intervals along the edge direction of the opening, each of the plurality of second connection portions is between two adjacent first connection portions, so that the two adjacent first connection portions are electrically connected through the second connection portion, the plurality of first connection portions and the plurality of second connection portions are respectively in different conductive layers relative to the base substrate.

For example, in the touch substrate provided by an embodiment of the present disclosure, the plurality of first connection portions are in the first conductive layer, and the plurality of second connection portions are in the second conductive layer, the first connection portion and the second connection portion are electrically connected through a second connection hole at least penetrating the insulating layer.

For example, in the touch substrate provided by an embodiment of the present disclosure, areas of regions enclosed respectively by orthographic projections of the plurality of first connection portions on the base substrate are substantially identical with each other.

For example, in the touch substrate provided by an embodiment of the present disclosure, the first connection portion is directly connected with the second touch sub-electrode and/or the second connection electrode.

For example, in the touch substrate provided by an embodiment of the present disclosure, the third touch sub-electrode further comprises a third connection portion, the third connection portion is between the second touch sub-electrode and the first connection portion, so that the first connection portion is electrically connected with the second touch sub-electrode and/or the second connection electrode through the third connection portion, and the third connection portion is at least in the first conductive layer and/or the second conductive layer.

For example, in the touch substrate provided by an embodiment of the present disclosure, a width of the third connection sub-electrode in the first direction is less than or equal to a width of the third connection portion in the first direction.

For example, in the touch substrate provided by an embodiment of the present disclosure, the third connection portion comprises a plurality of signal transmission sub-portions, and the plurality of signal transmission sub-portions are sequentially connected with each other, the plurality of signal transmission sub-portions are respectively in the first conductive layer and the second conductive layer.

For example, in the touch substrate provided by an embodiment of the present disclosure, each signal transmission sub-portion of the plurality of signal transmission sub-portions extends in a strip shape along a direction parallel to a tangent of an edge of the opening, or extends in a strip shape along a direction perpendicular to the tangent of the edge of the opening, a width of the signal transmission sub-portion in a direction perpendicular to an extension direction of the signal transmission sub-portion is less than a width of the compensation electrode in a direction perpendicular to an extension direction of the compensation electrode.

For example, the touch substrate provided by an embodiment of the present disclosure further comprises at least one dummy electrode, the at least one dummy electrode is in the second conductive layer and on a side of the third touch sub-electrode away from the first functional region.

At least one embodiment of the present disclosure further provides a display panel, the display panel comprises a display device and the touch substrate according to any embodiment of the present disclosure, and the display device and the touch substrate are arranged in a stacked manner

BRIEF DESCRIPTION OF THE DRAWINGS

In order to more clearly illustrate technical solutions of the embodiments of the present disclosure, the accompanying drawings of the embodiments will be introduced briefly below. It is apparent that the accompanying drawings in the following description only relate to some embodiments of the present disclosure and are not intended to limit the present disclosure.

DETAILED DESCRIPTION

Figure 1:
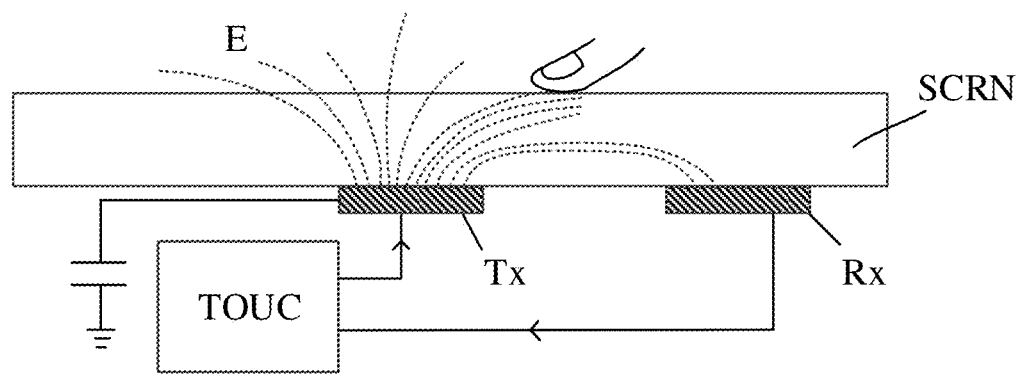
FIG. 1 is a schematic diagram of a working principle of a mutual capacitive touch structure.

In order to make objects, technical solutions, and advantages of the embodiments of the present disclosure more apparent, the technical solutions of the embodiments of the present disclosure will be described in a clearly and fully understandable way in connection with the drawings related to the embodiments of the present disclosure. It is apparent that the described embodiments are just a part but not all of the embodiments of the present disclosure. Based on the described embodiments of the present disclosure, those skilled in the art may obtain other embodiments, without any creative work, which shall be within the protection scope of the present disclosure.

Unless otherwise defined, all the technical and scientific terms used in the present disclosure have the same meanings as commonly understood by one of ordinary skill in the art to which the present disclosure belongs. The terms, such as "first," "second," or the like, which are used in the present disclosure, are not intended to indicate any sequence, amount or importance, but are merely used for distinguishing various components. Similarly, the terms such as "a," "an," or "the," etc., are not intended to limit the amount, but indicate the existence of at least one. The terms, such as "comprise/comprising," "include/including," or the like are intended to specify that the elements or the objects stated before these terms encompass the elements or the objects and equivalents thereof listed after these terms, but not preclude other elements or objects. The phrases, such as "connect/connecting/connected," "couple/coupling/coupled" or the like, are not intended to define a physical connection or mechanical connection, but may comprise an electrical connection/coupling, directly or indirectly. The terms, "on," "under," "left," "right," or the like are only used to indicate relative position relationship, and when the absolute position of the object which is described is changed, the relative position relationship may be changed accordingly.

The drawings in the present disclosure are not drawn strictly according to the actual scale, and the number of each selected from a group consisting of the first touch electrode, the second touch electrode, the first touch sub-electrode, the second touch sub-electrode, the first connection electrode, the second connection electrode, the first connection sub-electrode, the second connection sub-electrode, and the metal grid in the touch substrate is not limited to the number shown in the figure, the specific size and quantity of each structure can be determined according to actual needs. The drawings described in the present disclosure are only structural diagrams.

Organic light emitting diode (OLED) display products have characteristics of self-illumination, high contrast, low energy consumption, wide viewing angle, fast response speed, being applied to the flexible panel, wide temperature range, simple manufacturing, etc., and therefore have broad development prospects. In order to meet diversified use needs of users, it may be necessary to integrate various functions, such as a touch function, a fingerprint recognition function, etc., in the display products. For example, forming an on-cell touch structure in an OLED display panel is a common implementation method. This method enables the OLED display panel to achieve the touch function by forming the touch structure on an encapsulation film of the OLED display panel.

For example, taking the mutual capacitive touch structure as an example, the mutual capacitive touch structure includes a plurality of touch electrodes, the plurality of touch electrodes include a touch driving electrode TX and a touch sensing electrode RX extending in different directions. The touch driving electrode TX and the touch sensing electrode RX form a mutual capacitance for touch sensing at the intersection of the touch driving electrode TX and the touch sensing electrode RX. The touch driving electrode TX is used to input an excitation signal (such as a touch driving signal), and the touch sensing electrode Rx is used to output a touch sensing signal. By inputting an excitation signal to, for example, a touch driving electrode extending longitudinally, and receiving a touch sensing signal from, for example, a touch sensing electrode extending laterally, a detection signal reflecting the capacitance value of the coupling point (for example, the intersection point) of the lateral electrode and the longitudinal electrode can be obtained. When a finger touches the touch screen (such as the cover glass), the finger affects the coupling between the touch driving electrode TX and the touch sensing electrode RX close to the touch point, thus changing the capacitance value of the mutual capacitance at the intersection point between the two electrodes, resulting in the change of the output touch sensing signal. Therefore, corresponding coordinates of the touch point can be calculated according to the data change amount of the touch sensing signal.

FIG. 1 shows a schematic diagram of the working principle of a mutual capacitive touch structure. As shown in FIG. 1, driven by the touch driving circuit TOUC, the touch driving electrode Tx is applied with a touch driving signal, thereby generating an electric field line E, the electric field line E is received by the touch sensing electrode Rx to form a reference capacitance. When a finger touches the touch screen SCRN, because the human body is a conductor, part of the electric field line E generated by the touch driving electrode Tx is guided to the finger to form a finger capacitance, which reduces the electric field line E received by the touch sensing electrode Rx. Therefore, the capacitance value between the touch driving electrode Tx and the touch sensing electrode Rx decreases. The touch driving circuit TOUC obtains the above capacitance value through the touch sensing electrode Rx, and compares the above capacitance value with the reference capacitance to obtain the capacitance value change amount. According to the data of the capacitance value change amount and in combination with the position coordinates of each touch electrode, the coordinates of the touch point can be calculated.

With the wide application of display panels, users' requirements for the display panel, such as functions and appearance, are further increased. In order to meet the different actual needs of users, the appearance or functional regions of the display panel sometimes need to be designed as irregular or special shapes. For example, the display region of the display panel is designed to have an irregular shape having an opening or a notch, in which devices such as a camera and a distance sensor can be arranged, that is, the devices are exposed through the opening or notch so that the devices can receive external light, thereby facilitating the implementation of the narrow frame design of the display panel. However, for the above display panel having an irregular or special shape, because the opening or notch occupies a part of the display region, the touch structure for achieving the touch function is difficult to be evenly distributed in the display region. For example, the opening or notch may occupy the region originally used for arranging the touch driving electrode Tx and the touch sensing electrode Rx, for example, may occupy the region corresponding to the intersection between the touch driving electrode Tx and the touch sensing electrode Rx, thereby affecting the layout design of the touch structure at the intersection between the touch driving electrode Tx and the touch sensing electrode Rx, which is easy to cause adverse effects on the signal transmission effect in the touch structure, making it difficult for the display panel including the touch structure to achieve good touch performance.

At least one embodiment of the present disclosure provides a touch substrate, the touch substrate includes a base substrate, and a plurality of first touch electrodes and a plurality of second touch electrodes on the base substrate. The plurality of first touch electrodes are arranged along a first direction, and each of the plurality of first touch electrodes extends along a second direction different from the first direction, the plurality of second touch electrodes are arranged along the second direction, and each of the plurality of second touch electrodes extends along the first direction; each of the plurality of first touch electrodes includes a plurality of first touch sub-electrodes and at least one first connection electrode, the plurality of first touch sub-electrodes are arranged along the second direction, and each of the at least one first connection electrode is between two adjacent first touch sub-electrodes that are adjacent in the second direction, so that the two adjacent first touch sub-electrodes are electrically connected through the first connection electrode, the plurality of first touch sub-electrodes and the at least one first connection electrode are respectively in different conductive layers relative to the base substrate; the touch substrate includes a first functional region and a peripheral region at least partially surrounding the first functional region, the first functional region includes an opening, and the peripheral region includes an opening peripheral region at least partially in the opening; the plurality of first touch sub-electrodes are at least partially in the first functional region and outside the opening peripheral region, the at least one first connection electrode includes a first connection sub-electrode, and the first connection sub-electrode is at least partially in the opening peripheral region.

In the touch substrate provided by the above embodiments of the present disclosure, the first touch sub-electrode is located in the first functional region including the opening, by arranging the first connection sub-electrode for electrically connecting two adjacent first touch sub-electrodes at least partially in the opening peripheral region, the layout design of the first touch electrode in the touch substrate can be optimized, so as to improve the uniformity and consistency of the signal transmission load in the first touch electrode, thereby improving the stability and reliability of the signal transmission in the first touch electrode, improving the signal transmission effect in the touch substrate, which is beneficial for the touch substrate to achieve the good touch performance For example, in the touch substrate provided by the above embodiments of the present disclosure, by arranging the first connection sub-electrode at least partially in the opening peripheral region, the possible adverse effect caused by the parasitic capacitance between the first connection sub-electrode and other devices or structures in the first functional region can be reduced, so that the optimization of the overall performance of the touch substrate can be implemented.

Next, the embodiments of the present disclosure will be described in detail with reference to the accompanying drawings. It should be noted that the same reference numerals in different drawings will be used to refer to the same elements that have been described.

Figure 2:
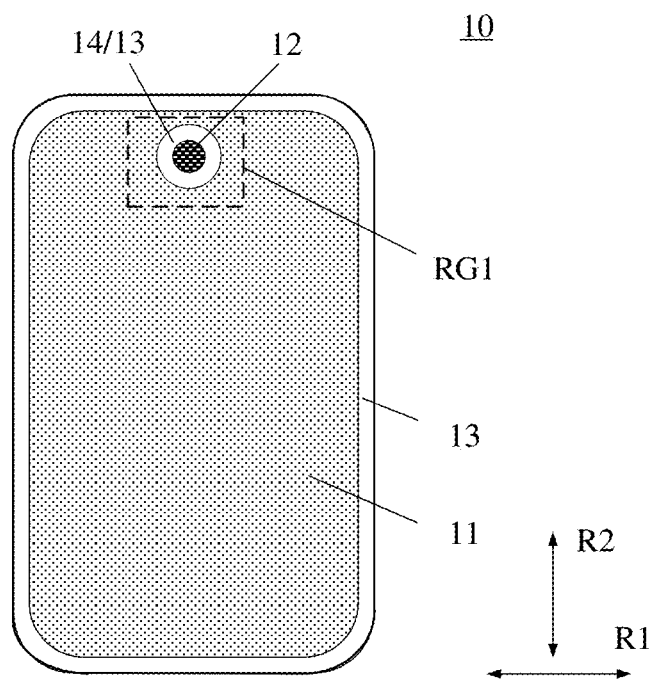
FIG. 2 is a schematic planar diagram of a touch substrate provided by some embodiments of the present disclosure.
Figure 3:
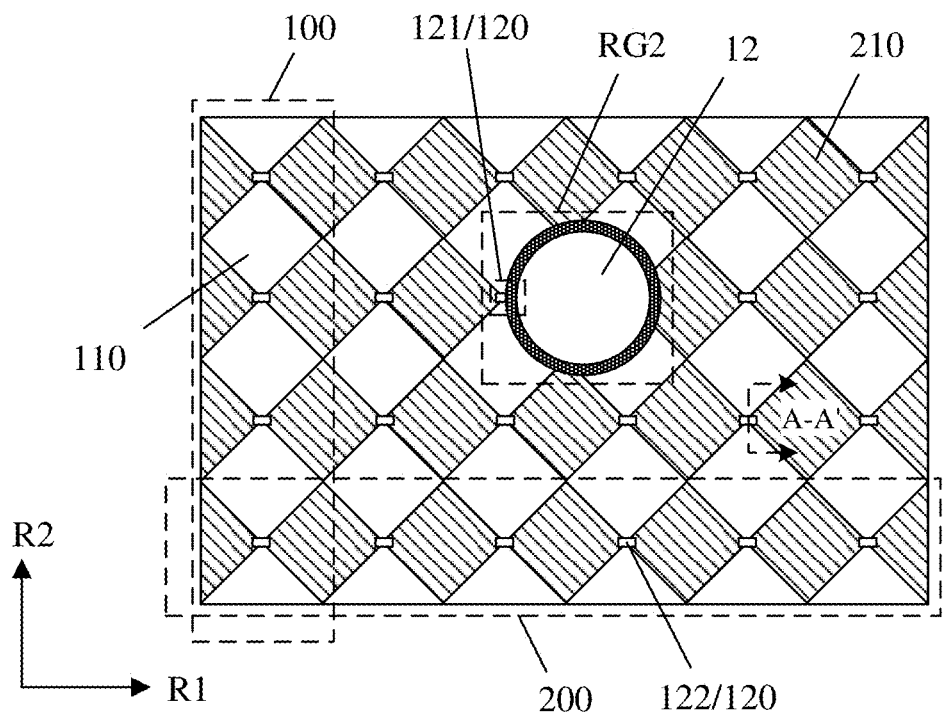
FIG. 3 is a partial planar structure schematic diagram of a touch substrate provided by some embodiments of the present disclosure.
Figure 4:
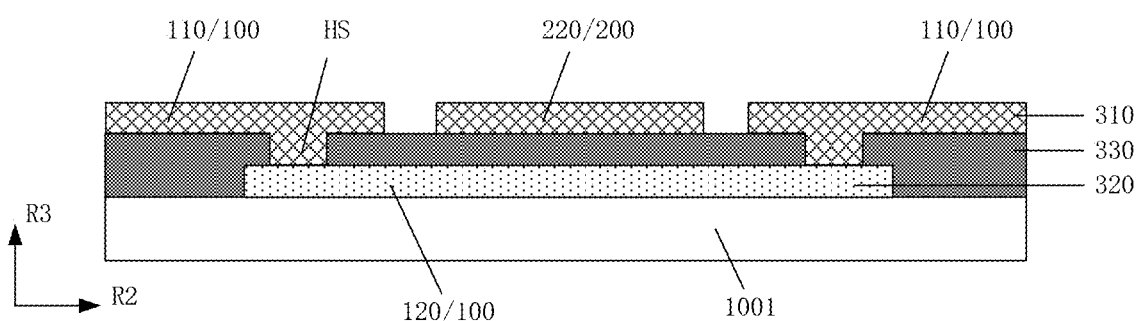
FIG. 4 is a partial cross-sectional structure schematic diagram of a touch substrate provided by some embodiments of the present disclosure.
Figure 5:
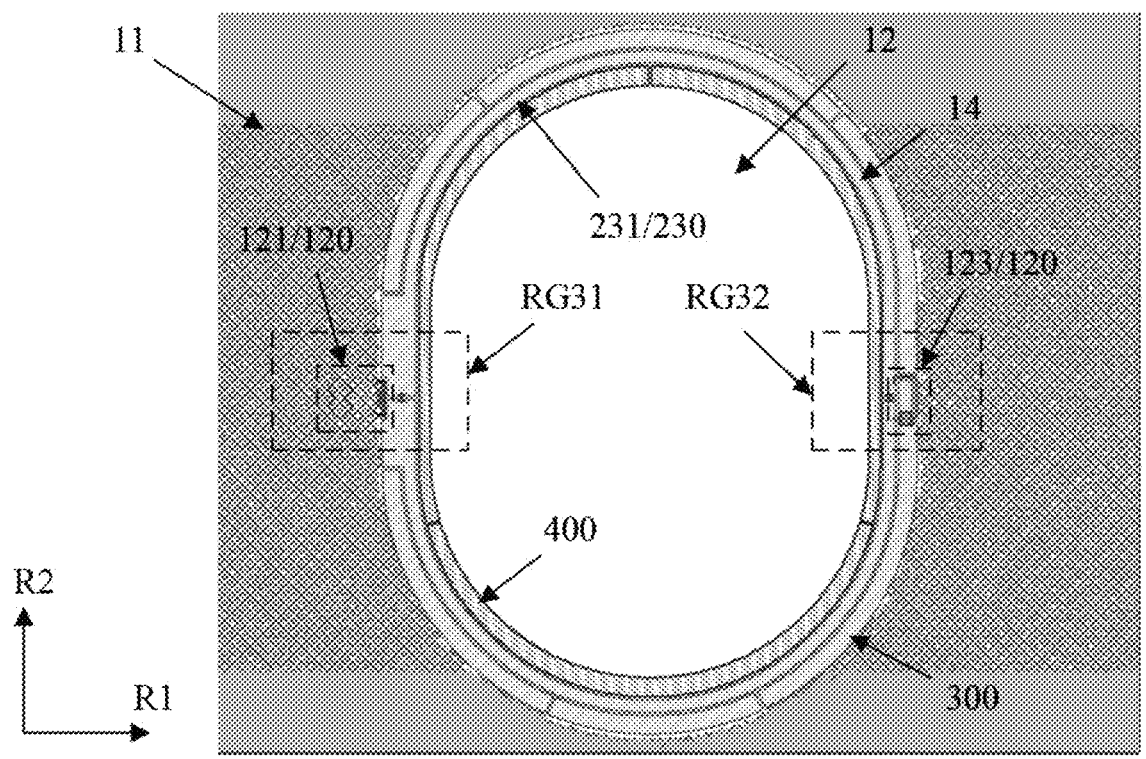
FIG. 5 is an enlarged schematic diagram of a partial region of a touch substrate provided by some embodiments of the present disclosure.

FIG. 2 is a schematic planar diagram of a touch substrate provided by some embodiments of the present disclosure; FIG. 3 is a partial planar structure diagram of a touch substrate provided by some embodiments of the present disclosure, for example, FIG. 3 is a partially enlarged schematic diagram of an example of a region RG1 shown in FIG. 2; FIG. 4 is a partial cross-sectional structure diagram of a touch substrate provided by some embodiments of the present disclosure, for example, FIG. 4 is a schematic cross-sectional diagram along a line A-A' shown in FIG. 3; FIG. 5 is an enlarged schematic diagram of a partial region of a touch substrate provided by some embodiments of the present disclosure, for example, FIG. 5 is a partially enlarged schematic diagram of an example of a region RG2 shown in FIG. 3.

For example, as shown in FIG. 2, the touch substrate 10 includes a first functional region 11 and a peripheral region 13 at least partially surrounding the first functional region 11. For example, in the embodiment shown in FIG. 2, the peripheral region 13 completely surrounds the first functional region 11. For example, the first functional region 11 may be configured to have functions such as display, touch, and the like. For example, the first functional region 11 may be configured as a touch region, or may also be configured as a region having both a display function and a touch function. The embodiments of the present disclosure are not specifically limited in this aspect. The first functional region 11 includes an opening, for example, the opening may be a closed opening in the touch substrate 10 shown in FIG. 2; alternatively, in some other embodiments, the opening may also be a non-closed opening formed on one side (or several sides) of the first functional region 11, for example, in the touch substrate 20 shown in FIG. 8. In the region where the opening is located, devices such as a camera and a distance sensor can be arranged to help achieve the narrow frame design.

Figure 8:
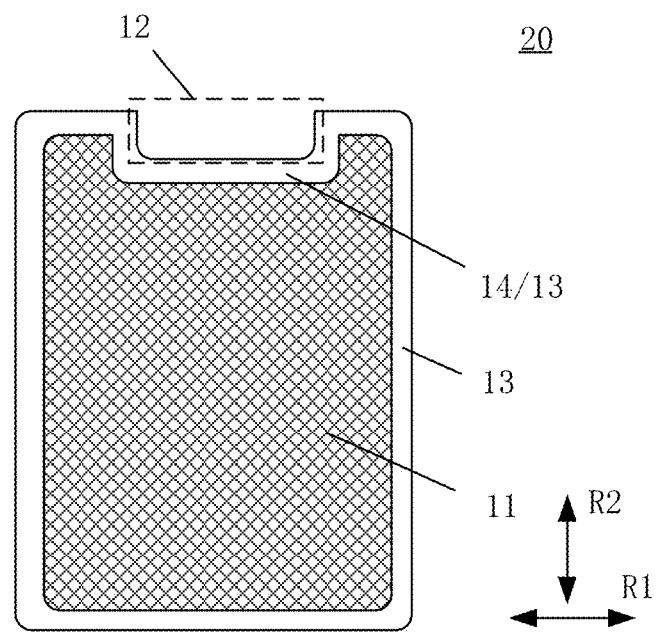
FIG. 8 is a schematic planar diagram of another touch substrate provided by some embodiments of the present disclosure.

It should be noted that the embodiments of the present disclosure do not specifically limit the shape or contour of the touch substrate 10. For example, the touch substrate provided by the embodiments of the present disclosure may be in a square shape as shown in FIG. 2 or FIG. 8, or other suitable regular or irregular shapes such as a circle, a regular hexagon, a regular octagon, etc., which are not specifically limited by the embodiments of the present disclosure.

It should be noted that the embodiments of the present disclosure take the closed opening shown in FIG. 2 as an example to explain the structure and function of the touch substrate 10, but this does not constitute a limitation of the present disclosure. The embodiments of the present disclosure do not specifically limit the setting position and the form of the opening in the touch substrate 10.

It should be noted that the embodiments of the present disclosure do not specifically limit the number, shape, or contour of the opening. For example, the number of the opening(s) in the embodiments of the present disclosure may be one as shown in FIG. 2 or FIG. 8, or may be two, three, or more; the opening in the embodiments of the present disclosure may be in a circle shape as shown in FIG. 2, or may be other suitable regular or irregular shapes such as square, regular hexagon, regular octagon, etc., and the embodiments of the present disclosure do not specifically limit this.

The peripheral region 13 includes an opening peripheral region 14 at least partially located in the opening. For example, in the embodiment shown in FIG. 2, the opening peripheral region 14 is entirely located in the opening. For example, in the embodiment shown in FIG. 8, the opening peripheral region 14 is only partially located in the opening, and the embodiments of the present disclosure are not specifically limited in this aspect.

For example, as shown in FIGS. 2 to 5, the touch substrate 10 includes a base substrate 1001, and a plurality of first touch electrodes 100 and a plurality of second touch electrodes 200 located on the base substrate 1001. The plurality of first touch electrodes 100 are arranged along a first direction R1, and each first touch electrode 100 extends along a second direction R2 different from the first direction R1; the plurality of second touch electrodes 200 are arranged along the second direction R2, and each second touch electrode 200 extends along the first direction R1.

For example, the included angle between the first direction R1 and the second direction R2 may be set between 70° and 90°, including 70° and 90°. For example, the included angle between the first direction R1 and the second direction R2 may be set to 70°, 75°, 80°, 85°, or 90°, and the specific value of the included angle may be set according to the actual situation, which is not specifically limited by the embodiments of the present disclosure.

For example, in the touch substrate 10 provided by the embodiments of the present disclosure, the first direction R1 may be perpendicular to the second direction R2. In a case that the touch substrate 10 provided by the embodiments of the present disclosure is applied to, for example, a display panel or a display apparatus, the first direction R1 may be a row direction of a sub-pixel array in the display panel or the display apparatus, and the second direction R2 may be a column direction of the sub-pixel array in the display panel or the display apparatus; alternatively, the first direction R1 may be the column direction of the sub-pixel array in the display panel or the display apparatus, and the second direction R2 may be the row direction of the sub-pixel array in the display panel or the display apparatus, which is not specifically limited by the embodiments of the present disclosure.

As shown in FIG. 3, each first touch electrode 100 includes a plurality of first touch sub-electrodes 110 and at least one first connection electrode 120. For example, the at least one first connection electrode 120 may be a plurality of first connection electrodes 120 shown in FIG. 3. The plurality of first touch sub-electrodes 110 are arranged along the second direction R2, and the first connection electrode 120 is located between two adjacent first touch sub-electrodes 110 in the second direction R2, so that the two adjacent first touch sub-electrodes 110 are electrically connected to each other through the first connection electrode 120.

It should be noted that the number of the first touch sub-electrode(s) 110 and the number of the first connection electrode(s) 120 included in the first touch electrode 100 shown in FIG. 3 are only an exemplary description, and the embodiments of the present disclosure are not specifically limited to this. It should be noted that the main body contour of the first touch sub-electrode 110 in the first touch electrode 100 shown in FIG. 3 is in a diamond shape; in other embodiments of the present disclosure, the first touch sub-electrode 110 may also adopt other regular or irregular shapes such as triangle, rectangle, hexagon, octagon, strip shape, etc., which are not specifically limited by the embodiments of the present disclosure.

The first touch sub-electrode 110 and the first connection electrode 120 are respectively in different conductive layers relative to the base substrate 1001. For example, as shown in FIG. 4, the first touch sub-electrode 110 may be located in the first conductive layer 310 on the base substrate 1001, and the first connection electrode 120 may be located in the second conductive layer 320 on the base substrate 1001. Alternatively, in other embodiments, the first touch sub-electrode 110 may be located in the second conductive layer 320 on the base substrate 1001, and the first connection electrode 120 may be located in the first conductive layer 310 on the base substrate 1001. The embodiments of the present disclosure are not specifically limited in this aspect.

For example, as shown in FIGS. 2 to 5, the plurality of first touch sub-electrodes 110 are at least partially located in the first functional region 11 and outside the opening peripheral region 14. For example, the plurality of first touch sub-electrodes 110 may be all located in the first functional region 11 as a whole. The first connection electrode 120 includes a first connection sub-electrode 121, the first connection sub-electrode 121 is at least partially located in the opening peripheral region 14. For example, as shown in FIG. 5, the first connection sub-electrode 121 may be partially located in the opening peripheral region 14 and partially located in the first functional region 11.

For example, the first connection sub-electrode 121 may be used to electrically connect two first touch sub-electrodes 110 located close to or adjacent to the opening of the first functional region 11. Thus, by setting the first connection sub-electrode 121 for electrically connecting the two adjacent first touch sub-electrodes 110 close to the opening of the first functional region 11 at least partially in the opening peripheral region 14, the layout design of the first touch electrode 100 in the touch substrate 10 can be optimized to improve the uniformity and consistency of the signal transmission load of each part of the first touch electrode 100, so as to improve the stability and reliability of the signal transmission in the first touch electrode 100, and improve the signal transmission effect in the touch substrate 10, which is beneficial for the touch substrate 10 to achieve the good touch performance, and better meets the needs of users for products having functional regions with different shapes (such as irregular or special shapes).

For example, in the touch substrate 10 provided by the above embodiments of the present disclosure, by setting the first connection sub-electrode 121 at least partially in the opening peripheral region 14, the possible adverse effect caused by the parasitic capacitance between the first connection sub-electrode 121 and other devices or structures in the first functional region 11 can be reduced, so that the overall performance of the touch substrate 10 can be further optimized.

For example, in the case that the touch substrate 10 provided by the above embodiments of the present disclosure is applied to a display panel or a display apparatus including a display device, for example, the first functional region 11 may be implemented as a display region, by setting the first connection sub-electrode 121 at least partially in the opening peripheral region 14, the adverse effect that the parasitic capacitance between the first connection sub-electrode 121 and other devices or structures in the display region may have on the display screen can be reduced. For example, because the first connection sub-electrode 121 and the second touch electrode 200 usually need to overlap with each other, the number of film layers at the overlapping position may be relatively more than the number of film layers at other positions, and the electrode arrangement is relatively dense. Therefore, by setting the first connection sub-electrode 121 at least partially in opening peripheral region 14, it is possible to reduce or avoid possible phenomena, such as dark etching patterns or moiré patterns of dots, lines, or blocks, that may appear in the display screen, so as to weaken or avoid the possible poor visibility display in the display screen and improve the display effect of the screen.

In some embodiments of the present disclosure, for example, with reference to FIG. 4, the touch substrate 10 further includes a first conductive layer 310, an insulating layer 330, and a second conductive layer 320. The first conductive layer 310, the insulating layer 330, and the second conductive layer 320 are located on the base substrate 1001 and are stacked with each other. The insulating layer 330 is located between the first conductive layer 310 and the second conductive layer 320. The first conductive layer 310 and the second conductive layer 320 are spaced apart and insulated from each other in a direction R3 perpendicular to the base substrate 1001 through the insulating layer 330. The first touch sub-electrode 110 is located in the first conductive layer 310, and the first connection electrode 120 is at least partially located in the second conductive layer 320. For example, the first connection sub-electrode 121 in the first connection electrode 120 is located in the second conductive layer 320, and the first touch sub-electrode 110 and the first connection electrode 120 are electrically connected through a hole structure HS at least penetrating the insulating layer 330.

It should be noted that the embodiments of the present disclosure do not limit the specific number of the hole(s) in the hole structure HS. For example, the number of the hole(s) in the hole structure HS may be 1, 2, 3, or more.

For example, as shown in FIG. 4, the first conductive layer 310 is located on a side of the second conductive layer 320 away from the base substrate 1001. Alternatively, in other embodiments of the present disclosure, the second conductive layer 320 may be located on a side of the first conductive layer 310 away from the base substrate 1001.

For example, in the embodiment shown in FIG. 4, the first conductive layer 310 may be a conductive layer closer to the user than the second conductive layer 320. Further, in a case that the first touch sub-electrode 110 and each second touch sub-electrode 210 and the second connection electrode 220 of the second touch electrode 200 described later all are located in the first conductive layer 310, the accuracy and sensitivity of the signals from the user's side and received on the first touch electrode 100 and the second touch electrode 200 can be improved, and therefore, the touch sensitivity of the touch substrate 10 is improved.

In some embodiments of the present disclosure, as shown in FIGS. 2 to 5, because the first functional region 11 has an opening, the parts of the first touch electrode 100 and the second touch electrode 200 that are originally located in the region where the opening is located and in adjacent regions need to be redesigned to ensure that the touch substrate 10 can achieve good touch performance. For example, the position, shape, or structure of the first connection sub-electrode 121 in the first touch electrode 100 needs to be redesigned.

In some embodiments of the present disclosure, as shown in FIGS. 2 to 5, the first connection electrode 120 further includes a second connection sub-electrode 122, the second connection sub-electrode 122 is located in the first functional region 11 and the second connection sub-electrode 122 is located in the second conductive layer 320. For example, compared with the first connection sub-electrode 121, the second connection sub-electrode 122 is relatively away from the position where the opening in the first functional region 11 is located. Therefore, the design of the second connection sub-electrode 122, such as the position, shape, or structure, may not be affected by factors such as the opening, for example, a conventional design in the art may be adopted to form the second connection sub-electrode 122. For example, the second connection sub-electrode 122 may adopt the "double 8" structure shown in FIG. 9A and FIG. 9B, or may adopt other suitable structures or patterns, and the embodiments of the present disclosure do not specifically limit this.

For example, the area of the region enclosed by the orthographic projection of the first connection sub-electrode 121 on the base substrate 1001 is substantially equal to the area of the region enclosed by the orthographic projection of the second connection sub-electrode 122 on the base substrate 1001. In other words, the area of the region occupied by the first connection sub-electrode 121 in a plane parallel to the base substrate 1001 may be substantially the same as the area of the region occupied by the second connection sub-electrode 122 in the plane parallel to the base substrate 1001. Thus, the areas of the first connection sub-electrode 121 and the second connection sub-electrode 122, which are used to electrically connect two adjacent first touch sub-electrodes 110 and are located in different positions or regions respectively, in the touch substrate 10 in the same plane parallel to the base substrate 1001 are substantially consistent with each other, the consistency and stability of the signal transmission load on each first connection sub-electrode 121 and each second connection sub-electrode 122 in the first touch electrode 100 can be improved, and therefore, the signal transmission effect in the first touch electrode 100 is improved.

For example, taking the touch substrate 10 in the embodiments shown in FIGS. 2 to 5 as an example, in the touch substrate 10, two first connection sub-electrodes 121 are respectively arranged on two sides (for example, the left side and the right side) of the opening in the first functional region 11 in the first direction R1. Next, taking the two first connection sub-electrodes 121 as an example, the structure, function, and the like of the first connection sub-electrode 121 included in the first touch electrode 100 will be described in detail.

Figure 6A:
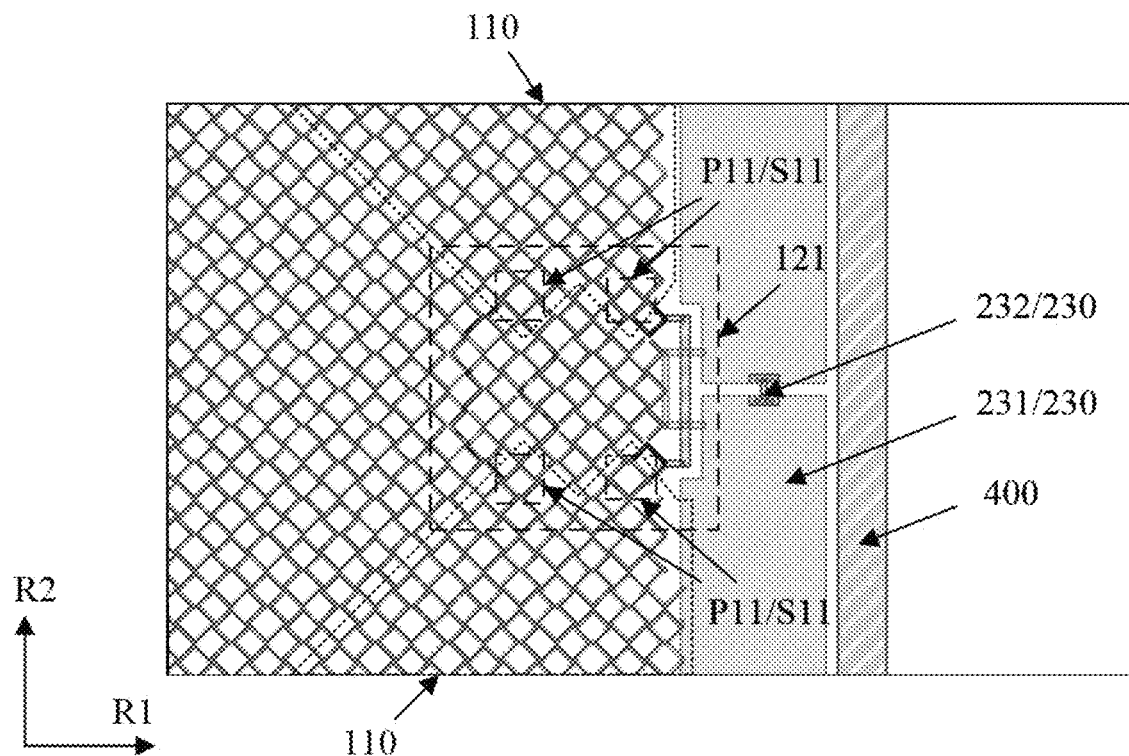
FIG. 6A is a partially enlarged schematic diagram of an example of a region RG31 shown in FIG. 5.
Figure 6B:
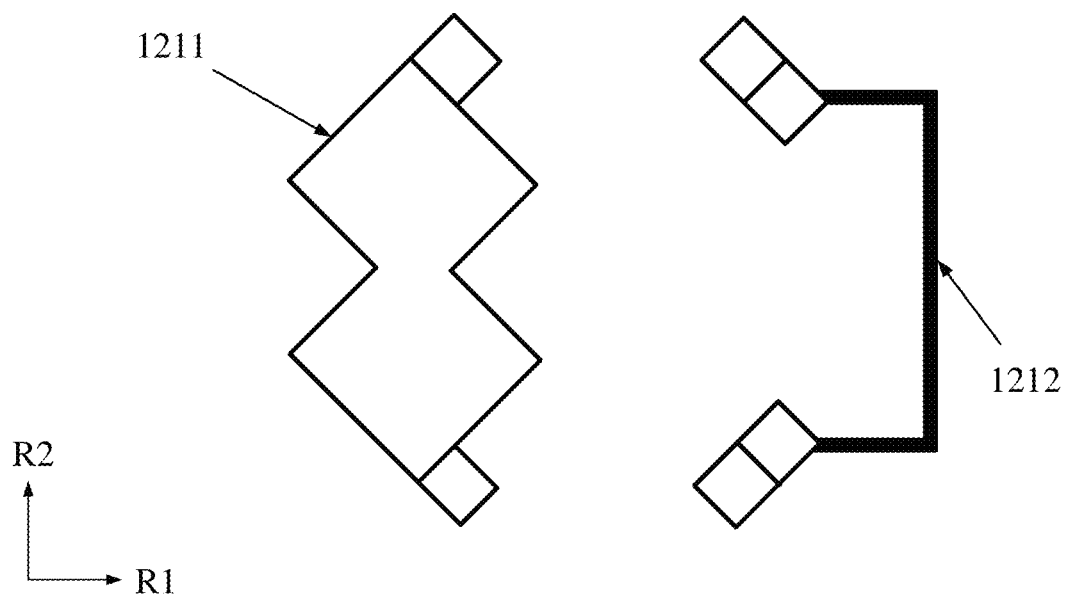
FIG. 6B is a schematic diagram of a first connection sub-electrode provided by some embodiments of the present disclosure.

FIG. 6A is a partially enlarged schematic diagram of an example of a region RG31 shown in FIG. 5. For example, FIG. 6A shows the first connection sub-electrode 121 located close to the left edge of the opening of the first functional region 11; FIG. 6B is a schematic diagram of a first connection sub-electrode provided by some embodiments of the present disclosure, for example, a schematic diagram of the first connection sub-electrode 121 shown in FIG. 6A.

Figure 9A:
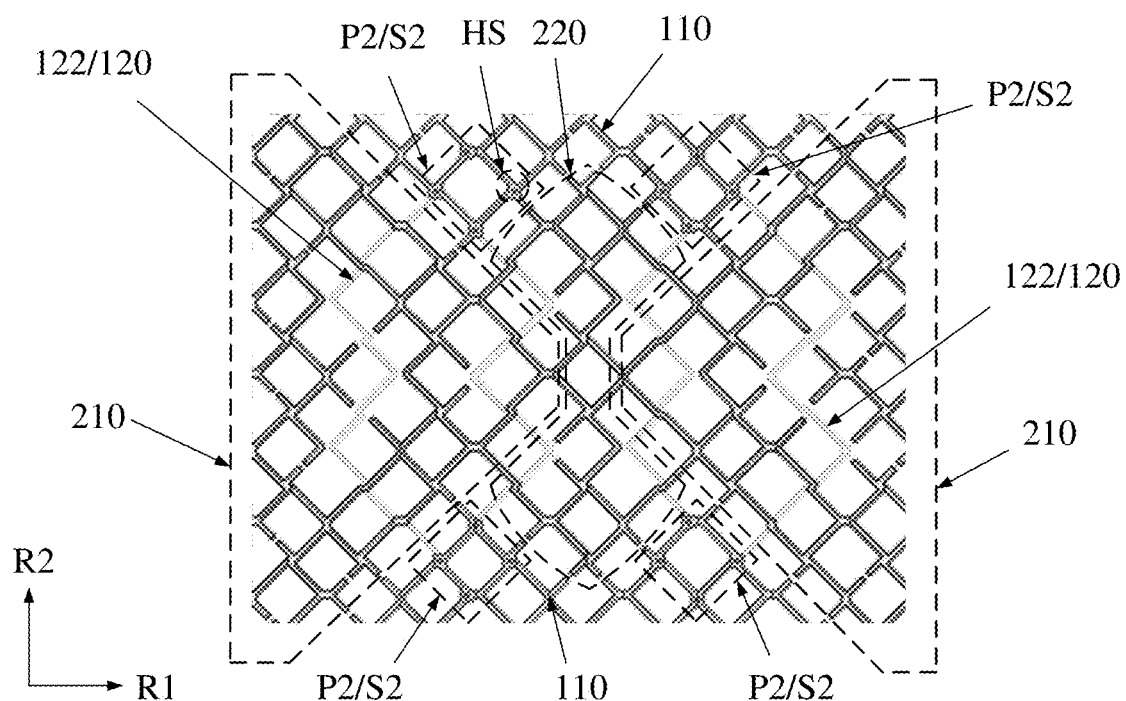
FIG. 9A is an enlarged schematic diagram of a partial region of another touch substrate provided by some embodiments of the present disclosure.

For example, as shown in FIGS. 2 to 6B and FIGS. 9A to 9B, the first connection sub-electrode 121 is located in the second conductive layer 320, and the first connection sub-electrode 121 and the first touch sub-electrode 110 at least partially overlap (for example, S11 in FIG. 6A is used to represent the overlapping portion) in the direction R3 perpendicular to the base substrate 1001, so that the first connection sub-electrode 121 and the first touch sub-electrode 110 can be electrically connected through, for example, the hole structure HS shown in FIG. 4. The second connection sub-electrode 122 and the first touch sub-electrode 110 at least partially overlap (for example, S2 in FIG. 9A is used to represent the overlapping portion) in the direction R3 perpendicular to the base substrate 1001, so that the second connection sub-electrode 122 and the first touch sub-electrode 110 can be electrically connected through, for example, the hole structure HS shown in FIG. 4.

For example, as shown in FIGS. 6A and 6B and FIGS. 9A and 9B, the area of the overlapping portion S11 between the first connection sub-electrode 121 and the first touch sub-electrode 110 is substantially equal to the area of the overlapping portion S2 between the second connection sub-electrode 122 and the first touch sub-electrode 110. Thus, in the case that the first connection sub-electrode 121 is partially arranged in the opening peripheral region 14, the contact area between the first touch sub-electrode 110 and the first connection sub-electrode 121 and the contact area between the first touch sub-electrode 110 and the second connection sub-electrode 122 can be substantially the same, thereby improving the stability and consistency of the electrical connection effect between the first connection electrode 120 and the corresponding first touch sub-electrode 110 that are located at different positions, and improving the signal transmission effect on the first touch electrode 100.

For example, the first connection sub-electrode 121 is electrically connected with the first touch sub-electrode 110 at a first position P11 of the first touch sub-electrode 110 through, for example, the hole structure HS shown in FIG. 4, and the second connection sub-electrode 122 is electrically connected with the first touch sub-electrode 110 at a second position P2 of the first touch sub-electrode 110 through, for example, the hole structure HS shown in FIG. 4, the relative position of the first position P11 in the first touch sub-electrode 110 is basically consistent with the relative position of the second position P2 in the first touch sub-electrode 110. For example, in each first touch sub-electrode 110 electrically connected to the first connection sub-electrode 121 or the second connection sub-electrode 122, the distribution or layout position of each first position P11 relative to the center of the corresponding first touch sub-electrode 110 is basically consistent with the distribution or layout position of each second position P2 relative to the center of the corresponding first touch sub-electrode 110. For example, in some examples, the first connection sub-electrode 121 and the second connection sub-electrode 122 are respectively in contact with the corresponding first touch sub-electrodes 110 at the same or similar positions of the first touch sub-electrodes 110 to achieve electrical connection. Thus, the stability and consistency of the electrical connection effect between the first connection electrode 120 and the corresponding first touch sub-electrode 110 at different positions in the touch substrate 10 can be further improved, and therefore, the signal transmission effect on the first touch electrode 100 is improved.

Figure 9B:
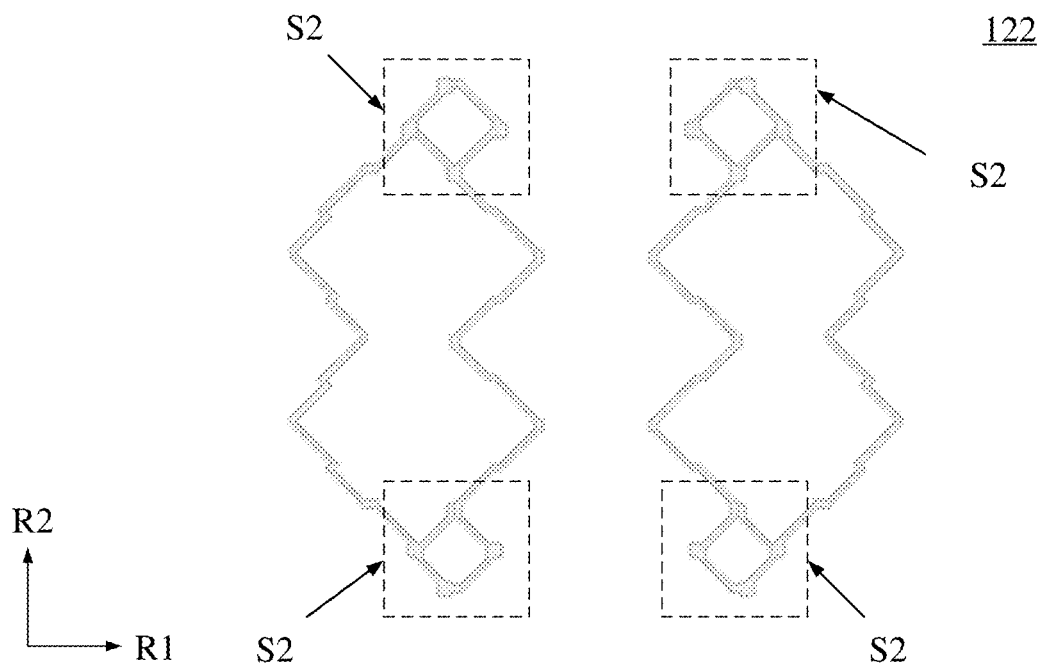
FIG. 9B is a schematic diagram of a second connection sub-electrode provided by some embodiments of the present disclosure.

For example, taking the first connection sub-electrode 121 located on the left side of the opening in the above embodiment as an example, because only part structure of the first connection sub-electrode 121 is located in the opening of the first functional region 11, and the other part structure is arranged in the first functional region 11, the part structure located in the first functional region 11 may adopt, for example, a design similar to the "8" structure of the second connection sub-electrode 122 shown in FIG. 9A and FIG. 9B. In other words, because the part structure, located in the first functional region 11, of the first connection sub-electrode 121 is not affected by the opening design in the first functional region 11, the part structure can adopt a design similar to or the same as the design of the second connection sub-electrode 122, such as the "8" structure, so as to simplify the manufacture process of the first connection electrode 120 and reduce the manufacture cost.

For example, as shown in FIG. 6A and FIG. 6B, the first connection sub-electrode 121 includes a first conducting sub-portion 1211 and a second conducting sub-portion 1212 spaced apart from each other. The first conducting sub-portion 1211 and the second conducting sub-portion 1212 are arranged between the two adjacent first touch sub-electrodes 110 and along the first direction R1, and are electrically connected with the two adjacent first touch sub-electrodes 110. The area of a region enclosed by the orthographic projection of the first conducting sub-portion 1211 on the base substrate 1001 is substantially equal to the area of the region enclosed by the orthographic projection of the second conducting sub-portion 1212 on the base substrate 1001. In other words, the area of the region occupied by the first conducting sub-portion 1211 in a plane parallel to the base substrate 1001 may be substantially the same as the area of the region occupied by the second conducting sub-portion 1212 in the plane parallel to the base substrate 1001. Thus, the consistency and stability of the signal transmission loads on the first conducting sub-portion 1211 and the second conducting sub-portion 1212 can be improved, thereby improving the signal transmission effect in the first touch electrode 100.

For example, taking the embodiment shown in FIG. 6A and FIG. 6B as an example, the first conducting sub-portion 1211 is located in the first functional region 11, and the second conducting sub-portion 1212 is partially located in the first functional region 11 and partially located in the opening of the first functional region 11. Thus, the first conducting sub-portion 1211 may adopt, for example, a design similar to the "8" structure of the second connection sub-electrode 122 shown in FIG. 9A and FIG. 9B. In other words, because the first conducting sub-portion 1211 is not affected by the opening design in the first functional region 11, the first conducting sub-portion 1211 may adopt a design similar to or the same as the design of the second connection sub-electrode 122, such as the "8" structure, thereby simplifying the manufacture process of the first connection electrode 120 and reducing the manufacture cost.

In some embodiments of the present disclosure, for example, with reference to FIG. 5, the first connection electrode 120 further includes a third connection sub-electrode 123, the third connection sub-electrode 123 is at least partially located in the opening peripheral region 14. For example, the third connection sub-electrode 123 may be partially located in the opening peripheral region 14 and partially located in the first functional region 11; alternatively, the third connection sub-electrode 123 may be located only in the opening peripheral region 14.

For example, the third connection sub-electrode 123 may be used to electrically connect two first touch sub-electrodes 110 located close or adjacent to the opening of the first functional region 11. Thus, by setting the third connection sub-electrode 123 for electrically connecting two adjacent first touch sub-electrodes 110 located close to the opening of the first functional region 11 partially or at least partially in the opening peripheral region 14, the layout design of the first touch electrode 100 in the touch substrate 10 can be optimized to improve the uniformity and consistency of the signal transmission load of each part of the first touch electrode 100, further, the stability and reliability of signal transmission in the first touch electrode 100 are improved, and the signal transmission effect in the touch substrate 10 is improved, which is beneficial for the touch substrate 10 to achieve the good touch performance, and better meets the needs of users for products having functional regions with different shapes (such as designed as irregular or special shapes).

For example, in the touch substrate 10 provided by the above embodiments of the present disclosure, by setting the third connection sub-electrode 123 partially or at least partially in the opening peripheral region 14, the possible adverse effect caused by the parasitic capacitance between the third connection sub-electrode 123 and other devices or structures in the first functional region 11 can be reduced, so as to further optimize the overall performance of the touch substrate 10.

Figure 7A:
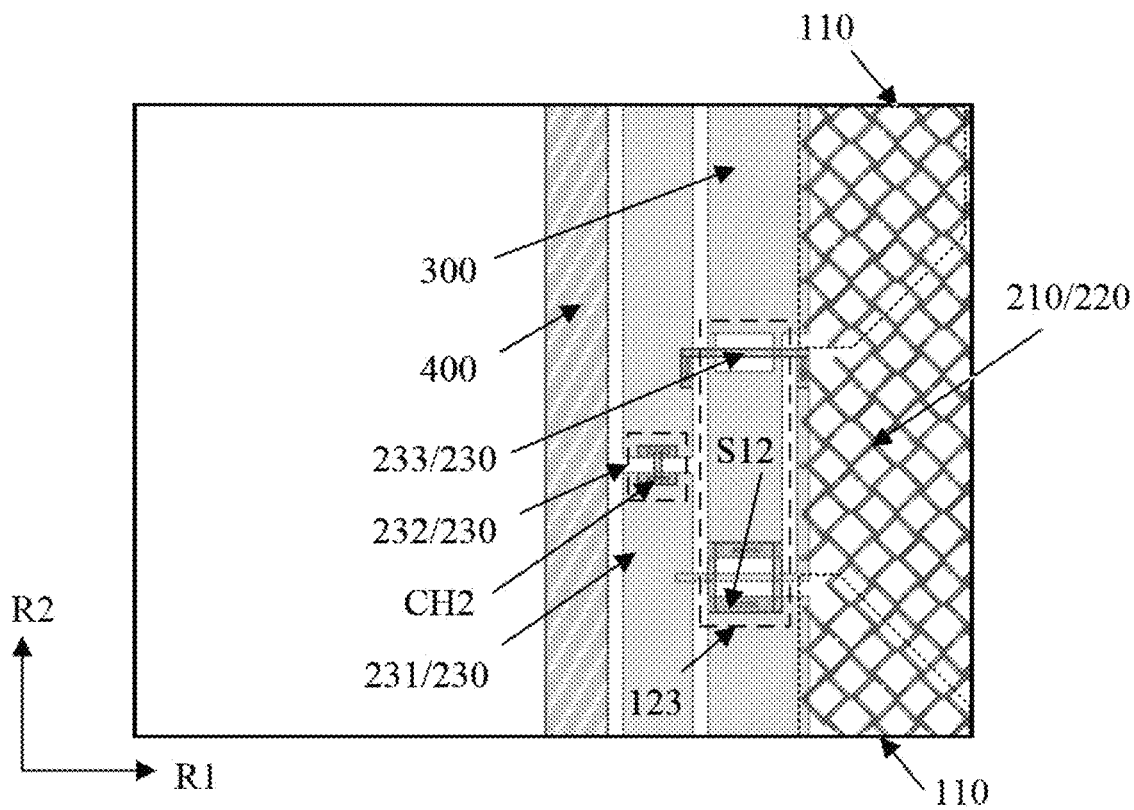
FIG. 7A is a partially enlarged schematic diagram of an example of a region RG32 shown in FIG. 5.
Figure 7B:
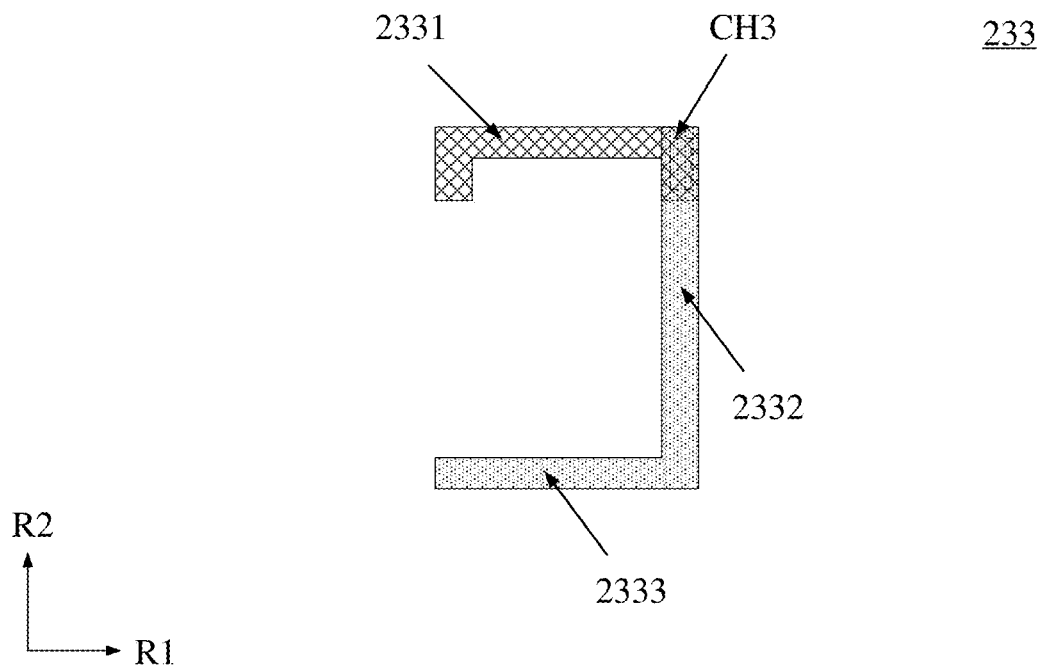
FIG. 7B is a schematic diagram of a third connection portion provided by some embodiments of the present disclosure.
Figure 7C:
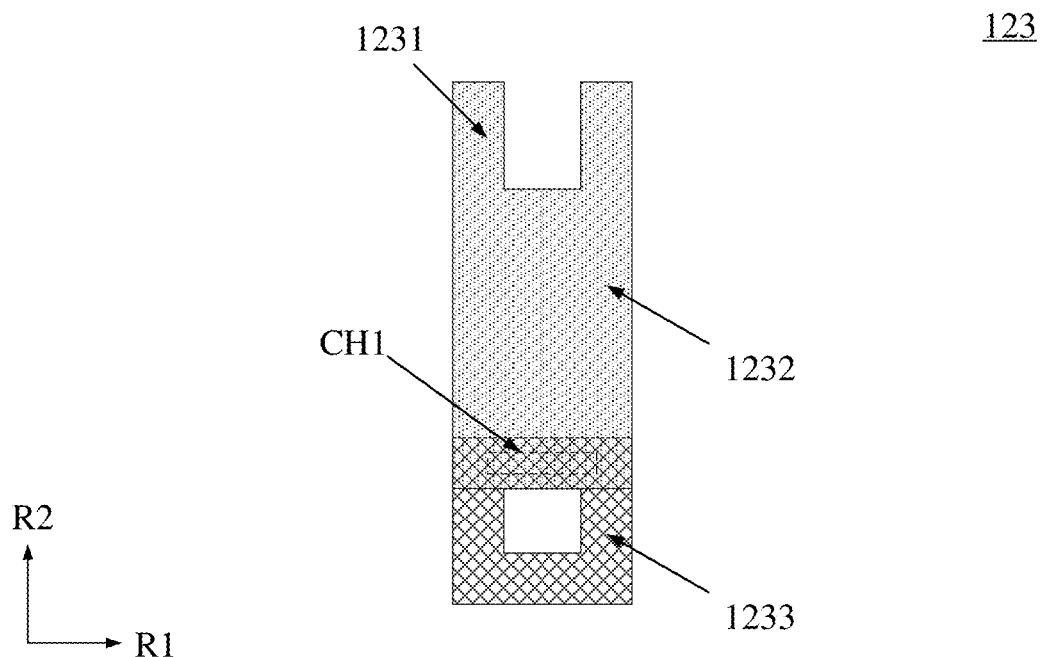
FIG. 7C is a schematic diagram of a third connection sub-electrode provided by some embodiments of the present disclosure.

FIG. 7A is a partially enlarged schematic diagram of an example of a region RG32 shown in FIG. 5. For example, FIG. 7A shows a third connection sub-electrode 123 located close to the right edge of the opening of the first functional region 11; FIG. 7B is a schematic diagram of a third connection portion provided by some embodiments of the present disclosure. For example, FIG. 7B is a schematic diagram of the third connection portion 233 shown in FIG. 7A; FIG. 7C is a schematic diagram of a third connection sub-electrode provided by some embodiments of the present disclosure, for example, the schematic diagram of the third connection sub-electrode 123 shown in FIG. 7A.

In some embodiments of the present disclosure, as shown in FIGS. 2 to 5 and FIG. 7A, the touch substrate 10 further includes at least one compensation electrode 300, for example, includes a plurality of compensation electrodes 300 as shown in FIG. 5. The compensation electrode 300 is at least partially located in the opening peripheral region 14, for example, the compensation electrode 300 is partially located in the opening peripheral region 14 and partially located in the first functional region 11, or the compensation electrode 300 may be located only in the opening peripheral region 14.

The compensation electrode 300 is configured to be connected with one first touch sub-electrode 110 adjacent to the compensation electrode 300, and the one first touch sub-electrode 110 is electrically connected with the corresponding third connection sub-electrode 123 through the compensation electrode 300. Thus, in a case that the compensation electrode 300 is used to achieve compensation for the first touch sub-electrode 110 located close to the opening of the first functional region 11 to ensure that the signal transmission loads on respective first touch sub-electrodes 110 located at different positions of the touch substrate 10 are basically consistent, the compensation electrode 300 can be used to flexibly achieve the electrical connection between the first touch sub-electrode 110 and the corresponding third connection sub-electrode 123, and therefore the layout design of the first touch electrode 100 is further optimized, which is conducive to the touch substrate 10 to better meet the user's needs for products having functional regions with different shapes (such as designed as irregular or special shapes).

For example, the compensation electrode 300 may further be configured to be connected with one second touch sub-electrode 210 adjacent to the compensation electrode 300, so as to achieve compensation for the second touch sub-electrode 210 located close to the opening of the first functional region 11 through the compensation electrode 300, thereby ensuring that the signal transmission loads on respective second touch sub-electrodes 210 located at different positions of the touch substrate 10 are also basically consistent.

For example, in conjunction with FIG. 5, FIG. 7A, and FIG. 7C, the compensation electrode 300 may be located in the first conductive layer 310 shown in FIG. 4, the third connection sub-electrode 123 is at least partially located in the second conductive layer 320, and the third connection sub-electrode 123 and the compensation electrode 300 at least partially overlap (for example, S12 in FIG. 7A is used to represent the overlapping portion) in the direction R3 perpendicular to the base substrate 1001, so that the third connection sub-electrode 123 and the compensation electrode 300 can be electrically connected through, for example, the hole structure HS shown in FIG. 4 or other similar or suitable hole structures.

For example, the third connection sub-electrode 123 is also at least partially located in the first conductive layer 310. For example, in the example shown in FIG. 7C, the third connection sub-electrode 123 is located in the first conductive layer 310 and the second conductive layer 320. The third connection sub-electrode 123 includes first connection sub-portions 1231 and 1232 located in the first conductive layer 310 and a second connection sub-portion 1233 located in the second conductive layer 320.

For example, the third connection sub-electrode 123 is respectively electrically connected with the two compensation electrodes 300, so as to be electrically connected with the corresponding two first touch sub-electrodes 110 through the two compensation electrodes 300. The first connection sub-portions 1231 and 1232 and one of the two compensation electrodes 300 (for example, the compensation electrode 300 located above the third connection sub-electrode 123 shown in FIG. 7A) are directly connected with each other and continuously arranged in the first conductive layer 310, for example, are formed by the same process using the same manufacture material, thereby reducing the manufacture cost. The second connection sub-portion 1233 is electrically connected with the other of the two compensation electrodes 300 (for example, the compensation electrode 300 located below the third connection sub-electrode 123 shown in FIG. 7A) through, for example, the hole structure HS shown in FIG. 4. The first connection sub-portion 1232 and the second connection sub-portion 1233 are electrically connected through the first connection hole CH1 shown in FIG. 7C. For example, the first connection hole CH1 at least penetrates the insulating layer 330. The setting manner of the first connection hole CH1 is basically the same as or similar to the hole structure HS shown in FIG. 4, and the repetition will not be repeated.

For example, the area of the third connection sub-electrode 123 composed of the first connection sub-portions 1231 and 1232 and the second connection sub-portion 1233 in the plane parallel to the base substrate 1001 is different from the area of the first connection sub-electrode 121 in the plane parallel to the base substrate 1001, or is also different from the area of the second connection sub-electrode 122 in the plane parallel to the base substrate 1001, and therefore, the requirements of users for products having functional regions with different shapes (such as designed as irregular or special shapes) can be better met.

For example, the first connection sub-portion 1231 includes two strip-shaped portions extending along the second direction R2, and the two strip-shaped portions are parallel to each other. For example, widths of the two strip-shaped portions in the first connection sub-portion 1231 in the first direction R1 may be substantially equal to each other, and lengths of the two strip-shaped portions in the second direction R2 may be substantially equal to each other. For example, the width of each strip-shaped portion in the first connection sub-portion 1231 in the first direction R1 is less than the width of the adjacent compensation electrode 300, which is adjacent to the first connection sub-portion 1231, in the first direction R1, for example, the width of each strip-shaped portion in the first connection sub-portion 1231 in the first direction R1 may be ⅙, ⅛, 1/10, or 1/12, etc. of the width of the adjacent compensation electrode 300 in the first direction R1, and the embodiments of the present disclosure are not specifically limited in this aspect.

The first connection sub-portion 1232 extends along the second direction R2. For example, the overall width of the first connection sub-portion 1231 in the first direction R1 is substantially equal to the width of the first connection sub-portion 1232 in the first direction R1 (for example, outer edges of the two strip-shaped portions of the first connection sub-portion 1231 extending along the second direction R2 are roughly aligned with two edges of the first connection sub-portion 1232 extending along the second direction R2, respectively), and the width of the first connection sub-portion 1232 in the first direction R1 is greater than the width of each strip-shaped portion in the first connection sub-portion 1231 in the first direction R1. For example, the width of the first connection sub-portion 1232 in the first direction R1 is smaller than the width of the adjacent compensation electrode 300 in the first direction R1, for example, the width of the first connection sub-portion 1232 in the first direction R1 may be ½, ⅔, ¾, ⅘, etc. of the width of the adjacent compensation electrode 300 in the first direction R1, and the embodiments of the present disclosure are not specifically limited in this aspect.

For example, the second connection sub-portion 1233 may adopt an annular structure with a square overall contour as shown in FIG. 7A and FIG. 7C, that is, a square structure with a square opening in the middle. The upper edge of the second connection sub-portion 1233 is electrically connected with the first connection sub-portion 1232 through the first connection hole CH1, and the lower edge of the second connection sub-portion 1233 is electrically connected with the compensation electrode 300 through the hole structure HS.

For example, the overall width of the second connection sub-portion 1233 in the first direction R1 is substantially equal to the width of the first connection sub-portion 1232 in the first direction R1. For example, the widths of the respective edges in the second connection sub-portion 1233 (for example, the widths of the edges, extending along the first direction R1, of the second connection sub-portion 1233 in the second direction R2, or the widths of the edges, extending along the second direction R2, of the second connection sub-portion 1233 in the first direction R1) may be the same or different from each other, for example, the widths of the two edges, extending along the first direction R1, of the second connection sub-portion 1233 may be the same, and the widths of the two edges, extending along the second direction R2, of the second connection sub-portion 1233 may be the same. For example, the width of the edge, extending along the first direction R1, of the second connection sub-portion 1233 may be slightly larger than the width of the edge, extending along the second direction R2, of the second connection sub-portion 1233, thereby facilitating the electrical connection effect between the second connection sub-portion 1233 and the first connection sub-portion 1232 as well as the corresponding compensation electrode 300. For example, the width of the edge, extending in the second direction R2, of the second connection sub-portion 1233 may be substantially equal to the width of the strip-shaped portion in the first connection sub-portion 1231 in the first direction R1.

For example, as shown in FIGS. 2 to 7A and FIGS. 9A to 9B, the second connection sub-electrode 122 and the first touch sub-electrode 110 at least partially overlap (for example, S2 in FIG. 9A is used to represent the overlapping portion) in the direction R3 perpendicular to the base substrate 1001, so that the second connection sub-electrode 122 and the first touch sub-electrode 110 can be electrically connected through the hole structure HS shown in FIG. 4. For example, the area of the overlapping portion S12 between the third connection sub-electrode 123 and the compensation electrode 300 (that is, the area of the overlapping portion S12 between the second connection sub-electrode 1233 and the compensation electrode 300 located below the second connection sub-electrode 1233) is substantially equal to the area of the overlapping portion S2 between the second connection sub-electrode 122 and the first touch sub-electrode 110. Therefore, in the case that the third connection sub-electrode 123 is at least partially arranged in the opening peripheral region 14, the contact area between the third connection sub-electrode 123 and the compensation electrode 300 can be basically consistent with the contact area between the second connection sub-electrode 122 and the first touch sub-electrode 110, further, the stability and consistency of the electrical connection effect between the first connection electrode 120 and the corresponding first touch sub-electrode 110 located at different positions are improved, and the signal transmission effect on the first touch electrode 100 is ameliorated.

For example, the compensation electrodes 300 extend along the edge direction of the opening and are arranged in sequence. Taking the third connection sub-electrode 123 shown in FIG. 7A and FIG. 7C as an example, the width of the third connection sub-electrode 123 in the first direction R1 is less than or equal to the width of the compensation electrode 300 in the direction perpendicular to the extension direction of the compensation electrode 300. For example, as shown in FIG. 7A, the width of the third connection sub-electrode 123 in the first direction R1 is less than the width of a part of the compensation electrode 300 located below the third connection sub-electrode 123 and adjacent to the third connection sub-electrode 123 in the first direction R1, for example, is also less than the width of a part of the compensation electrode 300 located above the third connection sub-electrode 123 and adjacent to the third connection sub-electrode 123 in, for example, the first direction R1.

For example, the width of the second conducting sub-portion 1212 in the first connection sub-electrode 121 in the first direction R1 may be less than or equal to the width of the compensation electrode 300 in a direction perpendicular to the extension direction of the compensation electrode 300. For example, the width of the second conducting sub-portion 1212 in the first direction R1 may be smaller than the width of the adjacent compensation electrode 300 in the first direction R1, thereby reducing the area occupied, in the opening peripheral region 14, by the part of the first connection sub-electrode 121 located in the opening peripheral region 14, thereby further implementing the optimization of the layout design in the opening peripheral region 14.

In some embodiments of the present disclosure, for example, as shown in FIG. 5, there are a plurality of compensation electrodes 300 in the touch substrate 10, the plurality of compensation electrodes 300 are arranged along the edge direction of the opening, for example, the plurality of compensation electrodes 300 are arranged along the circumferential direction of the opening to be electrically connected with the corresponding first touch sub-electrodes 110.

In some embodiments of the present disclosure, for example, as shown in FIG. 3 and FIG. 4, each second touch electrode 200 includes a plurality of second touch sub-electrodes 210 and at least one second connection electrode 220. For example, the at least one second connection electrode 220 may be a plurality of second connection electrodes 220 shown in FIG. 3. The plurality of second touch sub-electrodes 210 are arranged along the first direction R1, and each second connection electrode 220 is located between two adjacent second touch sub-electrodes 210 that are adjacent in the first direction R1, so that the two adjacent second touch sub-electrodes 210 are electrically connected to each other through the second connection electrode 220.

It should be noted that the number of the second touch sub-electrode(s) 210 included in the second touch electrode 200 and the number of the second connection electrode(s) 220 included in the second touch electrode 200 shown in FIG. 3 are only an exemplary description, and the embodiments of the present disclosure are not specifically limited in this aspect. It should be noted that the main body contour of the second touch sub-electrode 210 in the second touch electrode 200 shown in FIG. 3 is in a diamond shape; in other embodiments of the present disclosure, the second touch sub-electrode 210 may also adopt other regular or irregular shapes such as triangle, rectangle, hexagon, octagon, strip shape, etc., which are not limited by the embodiments of the present disclosure.

For example, the main body contour of the first touch sub-electrode 110 and the main body contour of the second touch sub-electrode 210 may be the same or different from each other.

For example, the second touch sub-electrode 210 and the second connection electrode 220 may be located in the same conductive layer relative to the base substrate 1001. For example, as shown in FIG. 4, the second touch sub-electrode 210 and the second connection electrode 220 are both located in the first conductive layer 310, that is, are located in the same conductive layer as the first touch sub-electrode 110 and are insulated from the first touch sub-electrode 110, for example.

For example, as shown in FIGS. 2 to 7A, each second touch electrode 200 further includes a third touch sub-electrode 230, the third touch sub-electrode 230 is at least partially located in the opening peripheral region 14 and arranged along the edge direction of the opening. The second touch sub-electrodes 210 and/or the second connection electrodes 220 located on two sides of the opening in the first direction R1 are electrically connected through the third touch sub-electrode 230. Therefore, the third touch sub-electrode 230 can be used to flexibly achieve the electrical connection between the second touch sub-electrode(s) 210 and/or the second connection electrode(s) 220 located on two sides of the opening (for example, the left side and the right side), so as to optimize the layout design of the second touch electrode 200, which is beneficial for the touch substrate 10 to better meet the needs of users for products having functional regions with different shapes (for example, designed as irregular or special shapes).

For example, the third touch sub-electrode 230 is at least partially located on the side of the compensation electrode 300 away from the first functional region 11. For example, the annular main body portion of the third touch sub-electrode 230 is located on the side of the compensation electrode 300 away from the first functional region 11. For example, compared with the compensation electrode 300, the third touch sub-electrode 230 (for example, the annular main body portion of the third touch sub-electrode 230) is located in the "inner ring" away from the first functional region 11, thereby facilitating the electrical connection between the compensation electrode 300 and the corresponding first touch sub-electrode 110, and facilitating the electrical connection between the compensation electrode 300 for compensating the second touch sub-electrode 210 (for example, the compensation electrode 300 for compensating the second touch sub-electrode 210 may be insulated from and alternately arranged with the compensation electrode 300 for compensating the first touch sub-electrode 110 along the edge direction of the opening) and the corresponding second touch sub-electrode 210.

For example, the compensation electrode 300 has a notch on the side away from the opening, that is, the compensation electrode 300 has a notch on the side facing the first functional region 11.

For example, the first connection sub-electrode 121 is at least partially located in the notch. For example, as shown in FIG. 5 and FIG. 6A, the region corresponding to the notch of the compensation electrode 300 on the side away from the opening can be used to arrange a part of the first connection sub-electrode 121, which helps to optimize the design structure of the first connection sub-electrode 121 and improve the signal transmission effect on the first connection sub-electrode 121.

For example, the third touch sub-electrode 230 is at least partially located in the notch. For example, as shown in FIG. 5, FIG. 6A, and FIG. 7A, there is an opening or gap between two adjacent compensation electrodes 300, and the opening or gap can be used to arrange(accommodate) at least a part of the third touch sub-electrode 230.

For example, as shown in FIGS. 5 and 7A, the notch may also be used to arrange at least a part of the third connection sub-electrode 123.

For example, the third touch sub-electrode 230 includes a plurality of first connection portions 231 and a plurality of second connection portions 232. Along the edge direction of the opening, for example, along the circumferential direction of the edge of the opening, the plurality of first connection portions 231 are spaced apart from each other, and each second connection portion 232 is located between two adjacent first connection portions 231, so that the two adjacent first connection portions 231 are electrically connected through the second connection portion 232. The first connection portion 231 and the second connection portion 232 are respectively located in different conductive layers relative to the base substrate 1001. Therefore, an electrostatic discharge (ESD) problem that is easily caused by the excessively large overall size of the third touch sub-electrode 230 can be reduced or avoided. For example, taking the third touch sub-electrode 230, having the circular structure as a whole, shown in FIG. 5 as an example, by setting the plurality of first connection portions 231 and the plurality of second connection portions 232, the electrostatic discharge problem easily caused by the third touch sub-electrode 230 forming a continuous ring with too large perimeter or area can be avoided.

For example, the first connection portion 231 may be located in the first conductive layer 310 shown in FIG. 4, and the second connection portion 232 may be located in the second conductive layer 320 shown in FIG. 4, and therefore, the first connection portion 231 and the second connection portion 232 can be formed in the same layer as other conductive structures in the touch substrate 10 (such as the first touch sub-electrode 110, the second touch sub-electrode 210, the first connection electrode 120, or the second connection electrode 220, etc.) based on the same material layer or using the same manufacture process, so as to simplify the manufacture process of the touch substrate 10 and reduce the manufacture cost of the touch substrate 10.

For example, the first connection portion 231 and the second connection portion 232 are electrically connected through, for example, the second connection hole CH2 shown in FIG. 7A, for example, the second connection hole CH2 at least penetrates the insulating layer 330. The setting manner of the second connection hole CH2 is basically the same as or similar to the hole structure HS shown in FIG. 4, and the repetition will not be repeated.

For example, the areas of the regions respectively enclosed by the orthographic projections of the plurality of first connection portions 231 on the base substrate 1001 are substantially the same as each other, that is, the areas occupied by the plurality of first connection portions 231 in a plane parallel to the base substrate 1001 are substantially the same as each other. Therefore, the stability and consistency of the signal transmission load on the third touch sub-electrode 230 can be improved, the signal transmission effect on the third touch sub-electrode 230 can be improved, and the potential electrostatic discharge problem can be further weakened or avoided.

In some embodiments of the present disclosure, the first connection portion 231 may also be directly connected to the second touch sub-electrode 210 and/or the second connection electrode 220. For example, referring to the embodiment shown in FIG. 6A, the first connection portion 231 may be directly connected with a second connection electrode (not specifically shown in the figure) located in the first functional region 11.

For example, as shown in FIG. 7A and FIG. 7B, the third touch sub-electrode 230 further includes a third connection portion 233, the third connection portion 233 is located between the second touch sub-electrode 210 and the first connection portion 231, so that the first connection portion 231 is electrically connected with the second touch sub-electrode 210 or the second connection electrode 220 through the third connection portion 233, and therefore, the second touch sub-electrodes 210 or the second connection electrodes 220 located on two sides of the opening of the first functional region 11 can be electrically connected through the third touch sub-electrode 230. For example, the third connection portion 233 may be located in the first conductive layer 310 shown in FIG. 4, or the second conductive layer 320 shown in FIG. 4, or a part of the third connection portion 233 may be located in the first conductive layer 310 shown in FIG. 4, and the other part of the third connection portion 233 may be located in the second conductive layer 320 shown in FIG. 4, and the two parts of the third connection portion 233 are electrically connected, for example, through a hole structure penetrating at least the insulating layer 330, the embodiments of the present disclosure are not specifically limited in this aspect.

In some embodiments of the present disclosure, the width of the third connection sub-electrode 123 in the first direction R1 is less than or equal to the width of the third connection portion 233 in the first direction R1, that is, is less than or equal to the width of the entire third connection portion 233 in the first direction R1.

For example, taking the examples shown in FIGS. 7A to 7C as an example, the width of the third connection sub-electrode 123 in the first direction R1 is less than the width of the third connection portion 233 in the first direction R1, that is, is less than the size occupied by the third connection portion 233 as a whole in the first direction R1.

In some embodiments of the present disclosure, the third connection portion 233 and the third connection sub-electrode 123 partially overlap in the direction perpendicular to the base substrate 1001.

For example, as shown in FIGS. 7A to 7C, the third connection portion 233 includes a plurality of signal transmission sub-portions 2331, 2332, and 2333, the plurality of signal transmission sub-portions 2331, 2332, and 2333 are sequentially connected to each other. For example, the size occupied by the plurality of signal transmission sub-portions 2331, 2332, and 2333 in the first direction R1 is the width of the third connection portion 233 as a whole in the first direction R1. For example, in the example shown in FIG. 7A and FIG. 7B, the width of the third connection unit 233 as a whole in the first direction R1 is substantially equal to the width of the signal transmission sub-portion 2331 or 2333 in the first direction R1.

For example, the plurality of signal transmission sub-portions 2331, 2332, and 2333 are respectively located in at least two different conductive layers relative to the base substrate 1001. Therefore, by adopting the method of staggering and electrically connecting the plurality of connection sub-portions located in different conductive layers, the signal transmission can be performed through the connection sub-portion in other conductive layers in the case that a short circuit or an open circuit occurs in one conductive layer, so as to further improve the stability and reliability of signal transmission.

For example, in the embodiments shown in FIGS. 7A to 7C, the signal transmission sub-portions 2332 and 2333 are located in the first conductive layer 310, and the signal transmission sub-portion 2331 is located in the second conductive layer 320. For example, the signal transmission sub-portions 2332 and 2333 may be arranged continuously and form a single integrated structure.

For example, the signal transmission sub-portions 2331 and 2332 may be electrically connected through, for example, the third connection hole CH3 shown in FIG. 7B, for example, the third connection hole CH3 at least penetrates the insulating layer 330. The setting manner of the third connection hole CH3 is basically the same as or similar to the hole structure HS shown in FIG. 4, and the repetition will not be repeated.

For example, in the case that the second touch sub-electrode 210 and the second connection electrode 220 are also located in the first conductive layer 310, the signal transmission sub-portions 2332 and 2333 may be continuously arranged with the second touch sub-electrode 210 or the second connection electrode 220 adjacent to the signal transmission sub-portions 2332 and 2333, thereby improving the stability of signal transmission on the second touch electrode 200.

It should be noted that the embodiments of the present disclosure include but are not limited to this aspect. In other words, the embodiments of the present disclosure do not specifically limit the conductive layers where the plurality of signal transmission sub-portions 2331, 2332, and 2333 are located, respectively. For example, the signal transmission sub-portions 2331 and 2332 may be located in the first conductive layer 310, and the signal transmission sub-portion 2333 may be located in the second conductive layer 320, or other suitable setting methods may be adopted, and the embodiments of the present disclosure are not specifically limited in this aspect.

For example, each of the signal transmission sub-portions 2331, 2332, and 2333 extends in a strip shape in a direction parallel to a tangent of the edge of the opening, or extends in a strip shape in a direction perpendicular to the tangent of the edge of the opening. For example, taking the example shown in FIGS. 7A to 7C as an example, each of the signal transmission sub-portions 2331, 2332, and 2333 extends in a strip shape along the first direction R1 or the second direction R2, respectively. For example, the signal transmission sub-portions 2331 and 2333 extend in strip shapes along the first direction R1, respectively, and the signal transmission sub-portion 2332 extends in a strip shape along the second direction R2.

For example, the width of each of the signal transmission sub-portions 2331, 2332, and 2333 in the direction perpendicular to the extension direction of the signal transmission sub-portion is smaller than the width of the compensation electrode 300 in the direction perpendicular to the extension direction of the compensation electrode 300. For example, taking the example shown in FIGS. 7A to 7C as an example, the width of each of the signal transmission sub-portions 2331 and 2333, extending along the first direction, in the second direction R2 is smaller than the width of the compensation electrode 300 in the first direction R1. The width of the signal transmission sub-portion 2332, extending along the second direction R2, in the first direction R1 is smaller than the width of the compensation electrode 300 in the first direction R1. Therefore, by making the signal transmission sub-portion 2332 extend in a strip shape along the second direction R2, the connection contact area between the signal transmission sub-portion 2332 and the adjacent second touch sub-electrode 210 or second connection electrode 220 can be increased, so that the stability of signal transmission on the second touch electrode 200 can be improved, and the size or area occupied by the third connection portion 233 in the touch substrate 10 can be reduced, and therefore, the layout design structure in the touch substrate 10 is further optimized.

For example, the signal transmission sub-portion 2331 extends along the first direction R1 and partially overlaps with the two strip-shaped portions of the first connection sub-portion 1231 in the direction perpendicular to the base substrate 1001. For example, the width of the signal transmission sub-portion 2331 in the second direction R2 may be substantially equal to the width of each strip-shaped portion of the first connection sub-portion 1231 in the first direction R1.

For example, the signal transmission sub-portion 2332 extends along the second direction R2 and does not overlap with the third connection sub-electrode 123 (for example, the first connection sub-portions 1231 and 1232, and the second connection sub-portion 1233) in the direction perpendicular to the base substrate 1001. For example, taking the example shown in FIGS. 7A to 7C as an example, the signal transmission sub-portion 2332 is located on the right side of the third connection sub-electrode 123. For example, the width of the signal transmission sub-portion 2332 in the first direction R1 may be slightly larger than the width of the signal transmission sub-portion 2331 in the second direction R2, which is conducive to improving the stability and reliability of the signal transmission on the third connection portion 233; alternatively, the width of the signal transmission sub-portion 2332 in the first direction R1 may be substantially equal to the width of the signal transmission sub-portion 2331 (or the signal transmission sub-portion 2333) in the second direction R2, thereby simplifying the manufacture process and reducing the manufacture cost.

For example, the signal transmission sub-portion 2333 extends along the first direction R1 and partially overlaps with the second connection sub-portion 1233 in the direction perpendicular to the base substrate 1001. For example, the width of the signal transmission sub-portion 2333 in the second direction R2 may be substantially equal to the width of the signal transmission sub-portion 2331 in the second direction R2.

It should be noted that the third connection portion 233 in the example shown in FIGS. 7A to 7C is only an exemplary description; in some other embodiments of the present disclosure, the third connection portion 233 may also adopt other suitable structures, shapes, positions, or the like according to actual needs, such as the actual layout design of the touch substrate 10, the embodiments of the present disclosure are not specifically limited in this aspect.

For example, as shown in FIGS. 5 to 7A, the touch substrate 10 further includes at least one dummy electrode 400, for example, includes a plurality of dummy electrodes 400 as shown in FIG. 5. The dummy electrode 400 may be located in the second conductive layer 320 shown in FIG. 4 and on the side of the third touch sub-electrode 230 away from the first functional region 11. For example, compared with the third touch sub-electrode 230, the dummy electrode 400 is located in the "inner ring" away from the first functional region 11. Therefore, the mutual interference between the device(s) or structure(s) located in the first functional region 11 and the device(s) or structure(s) located in the opening or the opening peripheral region 14 can be reduced or avoided by setting the dummy electrode 400, so as to improve the stability and reliability of the touch substrate 10.

It should be noted that, in other embodiments of the present disclosure, the dummy electrode 400 may also be located in the first conductive layer 310 shown in FIG. 4; alternatively, the dummy electrode 400 may also adopt a double-layer electrode structure. For example, one layer of the double-layer electrode structure is located in the first conductive layer 310 shown in FIG. 4, and the other layer of the double-layer electrode structure is located in the second conductive layer 320 shown in FIG. 4, and the two layers of the double-layer electrode structure are electrically connected, for example, through a hole structure at least penetrating the insulating layer 330, the embodiments of the present disclosure are not specifically limited in this aspect.

For example, the plurality of dummy electrodes 400 may be spaced apart and insulated from each other, or adjacent dummy electrodes 400 may be electrically connected with each other. For example, the plurality of dummy electrodes 400 may be in a floating or suspended state, or may be applied with the same or different electrical signals, which are not specifically limited by the embodiments of the present disclosure.

For example, in the plurality of dummy electrodes 400, there is a spacing between adjacent dummy electrodes 400, and the orthographic projections of the plurality of dummy electrodes 400 on the base substrate 1001 partially surround or basically completely surround the first functional region 11. Alternatively, in some other embodiments of the present disclosure, only one dummy electrode 400 may be provided in the opening peripheral region 14, and the orthographic projection of the dummy electrode 400 on the base substrate 1001 partially surround or basically completely surround the first functional region 11, the embodiments of the present disclosure are not specifically limited in this aspect.

In some embodiments of the present disclosure, as shown in FIG. 2, FIG. 3, and FIG. 5, the touch substrate 10 further includes a second functional region 12. The second functional region 12 is located in the opening of the first functional region 11, and the opening peripheral region 14 at least partially surrounds the second functional region 12 and is located between the second functional region 12 and the first functional region 11. The touch substrate 10 includes a first side and a second side opposite to each other, and the second functional region 12 is configured to allow light from the first side to pass through to the second side.

For example, the first functional region 11 and the second functional region 12 may be configured to have the same functions such as display, touch, etc., or may be configured to have different functions respectively. For example, devices such as a camera, a distance sensor, and the like may be arranged in the second functional region 12, thereby helping to implement the narrow frame design of the touch substrate 10.

For example, the first functional region 11 may be configured as a touch region, the second functional region 12 may also be configured as a touch region, or may be configured as a region with other functions different from the touch function, such as a display region, a camera region, and the like. For example, in the case that the touch substrate 10 has both a display function and a touch function, the first functional region 11 may be configured as a region having both a display function and a touch function, and the second functional region 12 may be configured as a region having other functions, such as a camera region, etc., the embodiments of the present disclosure are not specifically limited in this aspect.

In some embodiments of the present disclosure, as shown in FIGS. 5 to 7A, each first touch electrode 100 includes a grid structure formed by a plurality of metal grids, and each second touch electrode 200 includes a grid structure formed by a plurality of metal grids. For example, the metal grid can be a closed metal grid or a non-closed metal grid.

It should be noted that the patterns of the grid structure shown in FIGS. 5 to 7A (for example, the contour, the number, size, shape of included metal grids, etc.) are only illustrative. The embodiments of the present disclosure do not limit, for example, the number of metal grids formed in the grid structure and the specific pattern features such as shape, contour, size, etc. For example, the shapes of the metal grids in the grid structure shown in FIGS. 5 to 7A are all polygons, such as quadrilaterals. In some other embodiments of the present disclosure, the shapes of the metal grids can also be other polygons, such as triangles, pentagons, hexagons, etc., which can be designed according to actual needs. The embodiments of the present disclosure do not specifically limit the specific shape, size, etc. of the metal grids.

For example, one metal grid may correspond to one or more sub-pixels, and the orthographic projection of the one or more sub-pixels (for example, display sub-pixels R, G, B) on the base substrate is located in the region enclosed by the orthographic projection of the corresponding metal grid on the base substrate. For example, the mesh of the metal grid covers the one or more sub-pixels, for example, covers the pixel opening region(s) of the one or more sub-pixels.

For example, the orthographic projection of the metal line of the metal grid on the base substrate is located outside the orthographic projection of the pixel opening region of the corresponding one or more sub-pixels on the base substrate, that is, falls into the region enclosed by the orthographic projection of the pixel separation region between the pixel opening regions on the base substrate, and the pixel separation region may be, for example, a non-opening region of the pixel definition layer. The pixel separation region is used to separate the pixel opening regions of a plurality of sub-pixels, so as to separate the light-emitting layers of the respective sub-pixels to prevent cross-color.

In some embodiments of the present disclosure, the material of the metal grids in the grid structure of the first touch electrode 100 and the grid structure of the second touch electrode 200 may include metal materials such as aluminum, molybdenum, copper, silver, or alloy materials of these metal materials, such as silver palladium copper alloy (APC) materials.

For example, the material of the insulating layer 330 may be an inorganic insulating material, for example, the inorganic insulating material is a transparent material. For example, the inorganic insulating material is an oxide of silicon, a nitride of silicon, or a nitrogen oxide of silicon, such as silicon oxide, silicon nitride, and silicon oxynitride, or an insulating material including a metal nitrogen oxide such as aluminum oxide and titanium nitride. For example, the material of the insulating layer 330 may also be an organic insulating material to obtain good bending resistance. For example, the organic insulating material is a transparent material. For example, the organic insulating material is OCA optical adhesive. For example, the organic insulating material may include polyimide (PI), acrylate, epoxy resin, polymethylmethacrylate (PMMA), etc.

It should be noted that, in some other embodiments, the two second touch sub-electrodes 210 adjacent in the first direction R1 may also be connected through, for example, a bridge structure or the like in a conductive layer different from the conductive layer where the second touch sub-electrode 210 is located, while the two first touch sub-electrodes 110 adjacent in the second direction R2 may be connected through, for example, a connection electrode located in the same conductive layer as and integrally formed with the first touch sub-electrode 110, that is, the electrical connection mode between the two first touch sub-electrodes 110 adjacent in the second direction R2 and the electrical connection mode between the two second touch sub-electrodes 210 adjacent in the first direction R1 can be interchanged with each other.

In some embodiments of the present disclosure, the first touch electrode 100 and the second touch electrode 200 are insulated from each other, the first touch electrode 100 may be a touch driving electrode and the second touch electrode 200 may be a touch sensing electrode; alternatively, the first touch electrode 100 may be a touch sensing electrode and the second touch electrode 200 may be a touch driving electrode, and the embodiments of the present disclosure do not limit this.

For example, in the case that the touch substrate is applied to, for example, a display panel or a display apparatus, each first touch electrode 100 and each second touch electrode 200 may be respectively electrically connected with a signal line, and connected with a touch controller or a touch integrated circuit through the signal line. Taking the first touch electrode 100 as the touch sensing electrode and the second touch electrode 200 as the touch driving electrode as an example, the touch integrated circuit may be, for example, a touch chip for providing a touch driving signal to the second touch electrode 200, receiving a touch sensing signal from the first touch electrode 100, and processing the received touch sensing signal, for example, providing the processed data/signal to the system controller to achieve the touch sensing function. For example, one ends of the signal lines connected with the touch integrated circuit may be arranged on the same side of the touch region of the display panel to facilitate the connection with the touch integrated circuit; alternatively, a signal line may be respectively provided at each of the two ends of one second touch electrode 200. During operation, the touch integrated circuit simultaneously bidirectionally inputs a touch driving signal to the one second touch electrode 200 through two signal lines (bilateral driving), so that the speed of signal loading on the second touch electrode 200 can be increased, and the detection speed can be increased.

At least one embodiment of the present disclosure further provides a display panel, the display panel includes a display device and a touch substrate described in any embodiment of the present disclosure. In the display panel, the display device and the touch substrate are arranged in a stacked manner.

Figure 10:
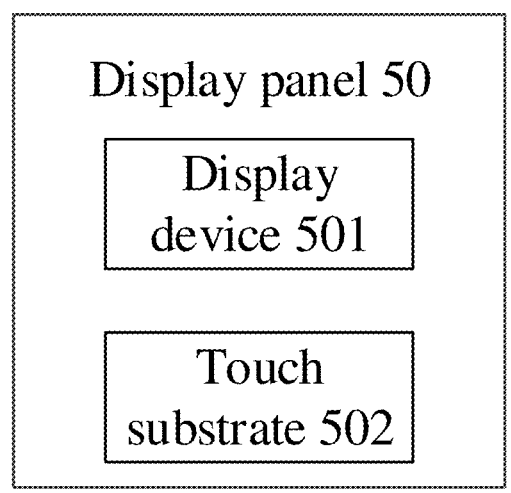
FIG. 10 is a schematic block diagram of a display panel provided by some embodiments of the present disclosure.

FIG. 10 is a schematic block diagram of a display panel provided by some embodiments of the present disclosure. For example, as shown in FIG. 10, the display panel 50 includes a display device 501 and a touch substrate 502. For example, the display device 501 and the touch substrate 502 may be stacked. For example, the touch substrate 502 may be the touch substrate described in any embodiment of the present disclosure, for example, the touch substrate 10 or the touch substrate 20.

For example, in some embodiments of the present disclosure, the display panel 50 may further include an encapsulation layer between the display device 501 and the touch substrate 502, thereby avoiding possible mutual interference between the display device 501 and the touch substrate 502, such as functional structures or film layer materials in the touch substrate 502.

Figure 11:
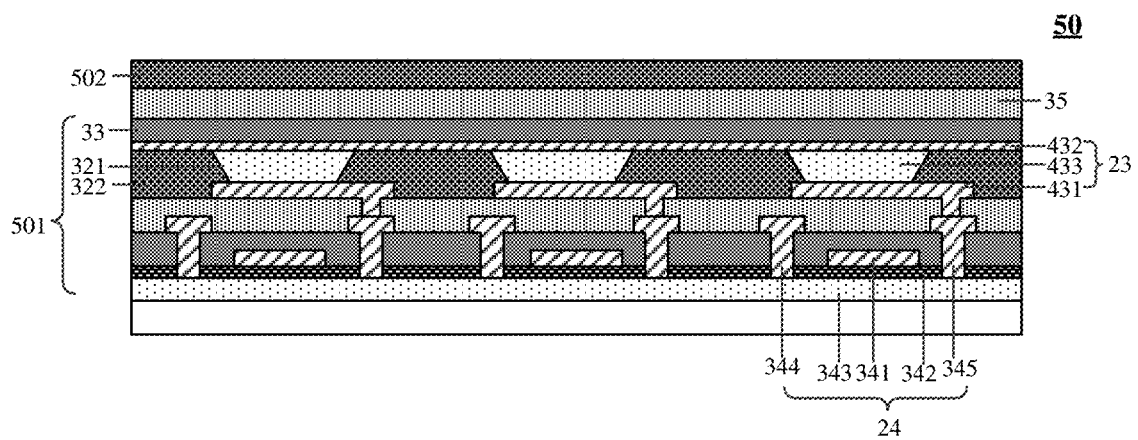
FIG. 11 is a schematic structural diagram of a specific example of a display panel provided by some embodiments of the present disclosure.

FIG. 11 is a structural diagram of a specific example of a display panel 50 provided by some embodiments of the present disclosure.

As shown in FIG. 11, the touch substrate 502 is located on the display side of the display device 501, for example, on the side closer to the user during use.

For example, the embodiment is described by taking a case that the display panel is an OLED display panel as an example. For example, the OLED display panel may be an on-cell or in-cell touch display panel. Of course, in other embodiments, the display panel may also be a liquid crystal display panel. The embodiments of the present disclosure do not limit the specific type of the display panel using the touch substrate provided by the embodiments of the present disclosure.

For example, the display device 501 includes a plurality of sub-pixels arranged in an array. For example, the display panel 50 is an OLED display panel, and the plurality of sub-pixels include a green sub-pixel, a red sub-pixel, a blue sub-pixel, and the like. Each sub-pixel includes a light-emitting element 23 and a pixel driving circuit that drives the light-emitting element 23 to emit light. The embodiments of the present disclosure do not limit the type and specific composition of the pixel driving circuit. For example, the pixel driving circuit may be a current driving type or a voltage driving type, may be a 2T1C (i.e., two transistors and a capacitor, the two transistors include a driving transistor and a data writing transistor) driving circuit, and may further include a compensation circuit (compensation transistor), a light-emitting control circuit (light-emitting control transistor), a reset circuit (reset transistor), and the like on the basis of the 2T1C driving circuit.

For the sake of clarity, FIG. 11 shows only the first transistor 24 in the pixel driving circuit that is directly electrically connected to the light-emitting element 23. The first transistor 24 may be a driving transistor configured to operate in a saturated state and control the magnitude of the current that drives the light-emitting element 23 to emit light. For example, the first transistor 24 may also be a light-emitting control transistor for controlling whether a current for driving the light-emitting element 23 to emit light flows. The embodiments of the present disclosure do not limit the specific type of the first transistor 24.

For example, the light-emitting element 23 is an organic light-emitting diode, which includes a first electrode 431, a light-emitting layer 433, and a second electrode 432. One selected from a group consisting of the first electrode 431 and the second electrode 432 is an anode and the other selected from a group consisting of the first electrode 431 and the second electrode 432 is a cathode. For example, the first electrode 431 is an anode and the second electrode 432 is a cathode. For example, the light-emitting layer 433 is an organic light-emitting layer or a quantum dot light-emitting layer. For example, the light-emitting element 23 may include, in addition to the light-emitting layer 433, auxiliary function layers such as a hole injection layer, a hole transport layer, an electron injection layer, and an electron transport layer. For example, the light-emitting element 23 is a top emitting structure, the first electrode 431 is reflective and the second electrode 432 is transmissive or semi-transmissive. For example, the first electrode 431 adopts a high work function material to act as an anode, for example, an ITO/Ag/ITO stacked structure; the second electrode 232 adopts a low work function material to act as a cathode, such as a semi-transmissive metal or metal alloy material, such as an Ag/Mg alloy material.

The first transistor 24 includes a gate electrode 341, a gate insulating layer 342, an active layer 343, a first electrode 344, and a second electrode 345, the second electrode 345 is electrically connected to the first electrode 231 of the light-emitting element 23. The embodiments of the present disclosure do not limit the type, material, structure, and the like of the first transistor 24, for example, the first transistor 24 may be a top gate type, a bottom gate type, etc., the active layer 343 of the first transistor 24 may be amorphous silicon, polysilicon (low-temperature polysilicon and high-temperature polysilicon), oxide semiconductor (for example, indium gallium tin oxide (IGZO)), etc., and the first transistor 24 may be an N-type transistor or a P-type transistor.

The transistors (for example, the first transistor 24) adopted in the embodiments of the present disclosure may be thin film transistors, field effect transistors, or other switching devices with the same characteristics. The embodiments of the present disclosure are illustrated by taking the thin film transistor as an example. The source electrode and drain electrode of the transistor used here may be symmetrical in structure, so there is no difference in structure between the source electrode and the drain electrode. In the embodiments of the present disclosure, in order to distinguish the two electrodes of the transistor other than the gate electrode, one of the two electrodes is directly described as the first electrode and the other of the two electrodes is directly described as the second electrode.

As shown in FIG. 11, the display device 501 further includes a pixel definition layer 322, the pixel definition layer 322 is arranged on the first electrode 431 of the light-emitting element 23, a plurality of openings 321 are formed in the pixel definition layer 322, so as to respectively expose the first electrodes 231 of the plurality of sub-pixels, thereby defining the pixel opening region of each sub-pixel, and the light-emitting layer of the sub-pixel is formed in the pixel opening region, the second electrode 432 is formed as a common electrode (that is, shared by a plurality of sub-pixels).

As shown in FIG. 11, the display device 501 further includes an encapsulation layer 33 between the light-emitting element 23 and the touch structure 502. The encapsulation layer 33 is configured to seal the light-emitting element 23 to prevent external moisture and oxygen from penetrating into the light-emitting element and the pixel driving circuit to cause damage to devices such as the light-emitting element 23. For example, the encapsulation layer 33 may be a single-layer structure or a multi-layer structure, for example, the encapsulation layer 33 includes an organic film, an inorganic film, or a multi-layer structure including an organic film and an inorganic film alternately stacked.

For example, as shown in FIG. 11, the display panel 50 further includes a buffer layer 35 between the display device 501 and the touch structure 502. For example, the buffer layer 35 is formed on the encapsulation layer 33 to improve the adhesion between the touch structure 502 and the display device 501. For example, the buffer layer 35 may be an inorganic insulating layer. For example, the material of the buffer layer 22 may be silicon nitride, silicon oxide, or nitrogen oxide of silicon. For example, the buffer layer 35 may also include a structure in which a silicon oxide layer and a silicon nitride layer are alternately stacked.

The display panel 50 provided by the embodiments of the present disclosure has both a touch function and a display function, and has all the technical effects of the touch substrate provided by the above embodiments of the present disclosure, and details are not described herein again.

At least one embodiment of the present disclosure further provides the electronic equipment, the electronic equipment includes the touch substrate described in any embodiment of the present disclosure, for example, may include the touch substrate 10 or the touch substrate 20 described above.

Figure 12:
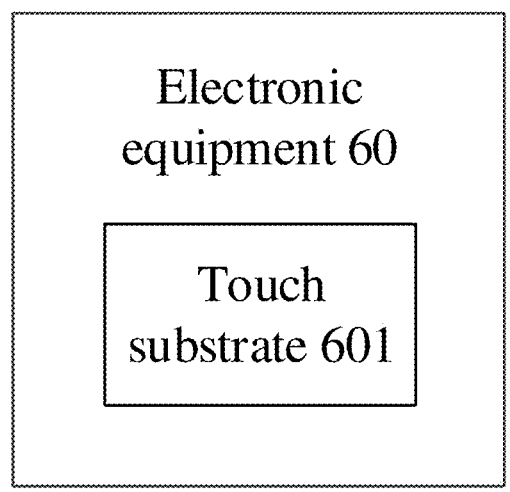
FIG. 12 is a schematic block diagram of electronic equipment provided by some embodiments of the present disclosure.

FIG. 12 is a schematic block diagram of electronic equipment provided by some embodiments of the present disclosure. For example, as shown in FIG. 12, the electronic equipment 60 includes a touch substrate 601. For example, the touch substrate 601 may be a touch substrate described in any embodiment of the present disclosure, such as the touch substrate 10 or the touch substrate 20 in the above embodiment.

For example, the electronic equipment 60 may be touch equipment or a touch apparatus with a touch function, or may also be display equipment or a display apparatus with a display function and a touch function, such as an OLED display apparatus, a QLED display apparatus, a liquid crystal display apparatus, or the like.

For the structure, function, and technical effect of the electronic equipment provided by the above embodiments of the present disclosure, reference may be made to the corresponding contents in the touch substrate provided by the above embodiments of the present disclosure, and will not be repeated here.

For example, the electronic equipment may be any product or component having a touch function (and a display function), such as a monitor, an OLED panel, an OLED TV, a liquid crystal display panel, a liquid crystal display TV, a QLED panel, a QLED TV, an electronic paper, a mobile phone, a tablet computer, a notebook computer, a digital photo frame, a navigator, etc.

The following several statements should be noted:

(1) The accompanying drawings involve only the structure(s) in connection with the embodiment(s) of the present disclosure, and other structure(s) can refer to common design(s).

(2) For clarity, in the accompanying drawings used for illustrating the embodiment(s) of the present disclosure, the thickness of a layer or a region may be enlarged or narrowed, that is, the drawings are not drawn in a real scale. However, it should understood that, in the case in which a component or element such as a layer, film, region, substrate, or the like is referred to be "on" or "under" another component or element, it may be directly on or under the another component or element or a component or element may be interposed therebetween.

(3) In case of no conflict, the embodiments of the present disclosure and the features in the embodiments may be mutually combined to obtain new embodiments.

The above descriptions are only specific embodiments of the present disclosure, but the protection scope of the present disclosure is not limited thereto, and the protection scope of the present disclosure should be determined by the protection scope of the claims.

What is claimed is:

1. A touch substrate, comprising:
a base substrate; and
a plurality of first touch electrodes and a plurality of second touch electrodes on the base substrate,
wherein the plurality of first touch electrodes are arranged along a first direction, and each of the plurality of first touch electrodes extends along a second direction different from the first direction,
the plurality of second touch electrodes are arranged along the second direction, and each of the plurality of second touch electrodes extends along the first direction;
each of the plurality of first touch electrodes comprises a plurality of first touch sub-electrodes and at least one first connection electrode, the plurality of first touch sub-electrodes are arranged along the second direction, and a first connection electrode of the at least one first connection electrode is between two adjacent first touch sub-electrodes that are adjacent in the second direction, so that the two adjacent first touch sub-electrodes are electrically connected through the first connection electrode,
the plurality of first touch sub-electrodes and the at least one first connection electrode are respectively in different conductive layers relative to the base substrate;
the touch substrate comprises a first functional region and a peripheral region at least partially surrounding the first functional region, the first functional region comprises an opening, and the peripheral region comprises an opening peripheral region at least partially in the opening;
the plurality of first touch sub-electrodes are at least partially in the first functional region and outside the opening peripheral region, and
the at least one first connection electrode comprises a first connection sub-electrode, and the first connection sub-electrode is at least partially in the opening peripheral region.

2. The touch substrate according to claim 1, further comprising a first conductive layer, an insulating layer, and a second conductive layer,
wherein the first conductive layer, the insulating layer, and the second conductive layer are on the base substrate and are stacked with each other;
the insulating layer is between the first conductive layer and the second conductive layer, and the first conductive layer and the second conductive layer are spaced apart and insulated from each other in a direction perpendicular to the base substrate through the insulating layer;
the plurality of first touch sub-electrodes are in the first conductive layer, and the at least one first connection electrode is at least partially in the second conductive layer, and
each first touch sub-electrodes is electrically connected to a corresponding first connection electrode through a hole structure at least penetrating the insulating layer.

3. The touch substrate according to claim 2, wherein the at least one first connection electrode further comprises a second connection sub-electrode, the second connection sub-electrode is in the first functional region, and the second connection sub-electrode is in the second conductive layer.

4. The touch substrate according to claim 3, wherein the first connection sub-electrode is in the second conductive layer, and the first connection sub-electrode and the first touch sub-electrode at least partially overlap in the direction perpendicular to the base substrate, so that the first connection sub-electrode and the first touch sub-electrode are electrically connected through the hole structure;
the second connection sub-electrode and the first touch sub-electrode at least partially overlap in the direction perpendicular to the base substrate, so that the second connection sub-electrode and the first touch sub-electrode are electrically connected through the hole structure;
an area of an overlapping portion between the first connection sub-electrode and the first touch sub-electrode is substantially equal to an area of an overlapping portion between the second connection sub-electrode and the first touch sub-electrode.

5. The touch substrate according to claim 4, wherein the first connection sub-electrode is electrically connected with the first touch sub-electrode at a first position of the first touch sub-electrode through the hole structure,
the second connection sub-electrode is electrically connected with the first touch sub-electrode at a second position of the first touch sub-electrode through the hole structure, and
a relative position of the first position in the first touch sub-electrode is substantially consistent with a relative position of the second position in the first touch sub-electrode.

6. The touch substrate according to claim 4, wherein the first connection sub-electrode comprises a first conducting sub-portion and a second conducting sub-portion spaced apart from each other,
the first conducting sub-portion and the second conducting sub-portion are arranged between the two adjacent first touch sub-electrodes and along the first direction, the first conducting sub-portion are electrically connected with the two adjacent first touch sub-electrodes, respectively, and the second conducting sub-portion are electrically connected with the two adjacent first touch sub-electrodes, respectively, and an area of a region enclosed by an orthographic projection of the first conducting sub-portion on the base substrate is substantially equal to an area of a region enclosed by an orthographic projection of the second conducting sub-portion on the base substrate.

7. The touch substrate according to claim 3, wherein the at least one first connection electrode further comprises a third connection sub-electrode, and the third connection sub-electrode is at least partially in the opening peripheral region, the touch substrate further comprises at least one compensation electrode, and the at least one compensation electrode is at least partially in the opening peripheral region, the a compensation electrode is configured to be connected with one first touch sub-electrode adjacent to the compensation electrode, and the one first touch sub-electrode is electrically connected with a corresponding third connection sub-electrode through the compensation electrode.

8. The touch substrate according to claim 7, wherein the third connection sub-electrode is at least partially in the second conductive layer, and the compensation electrode is in the first conductive layer, the third connection sub-electrode and the compensation electrode at least partially overlap in the direction perpendicular to the base substrate, so that the third connection sub-electrode and the compensation electrode are electrically connected through the hole structure, the second connection sub-electrode and the first touch sub-electrode at least partially overlap in the direction perpendicular to the base substrate, so that the second connection sub-electrode and the first touch sub-electrode are electrically connected through the hole structure;

an area of an overlapping portion between the third connection sub-electrode and the compensation electrode is substantially equal to an area of an overlapping portion between the second connection sub-electrode and the first touch sub-electrode.

9. The touch substrate according to claim 8, wherein the third connection sub-electrode is further at least partially in the first conductive layer, and the third connection sub-electrode comprises at least one first connection sub-portion in the first conductive layer and a second connection sub-portion in the second conductive layer, the third connection sub-electrode is respectively electrically connected with two compensation electrodes, so as to be electrically connected with corresponding two first touch sub-electrodes through the two compensation electrodes, the at least one first connection sub-portion and one of the two compensation electrodes are directly connected with each other and continuously arranged in the first conductive layer, and the second connection sub-portion is electrically connected with the other one of the two compensation electrodes through the hole structure, the at least one first connection sub-portion and the second connection sub-portion are electrically connected through a first connection hole at least penetrating the insulating layer.

10. The touch substrate according to claim 7, wherein the compensation electrode extends along an edge direction of the opening;

a width of the third connection sub-electrode in the first direction is less than or equal to a width of each compensation electrode in a direction perpendicular to an extension direction of the each compensation electrode.

11. The touch substrate according to claim 7, wherein each of the plurality of second touch electrodes comprises a plurality of second touch sub-electrodes and at least one second connection electrode, the plurality of second touch sub-electrodes are arranged along the first direction, and a second connection electrode of the at least one second connection electrode is between two adjacent second touch sub-electrodes that are adjacent in the first direction, so that the two adjacent second touch sub-electrodes are electrically connected through the second connection electrode, and the plurality of second touch sub-electrodes and the at least one second connection electrode are in the first conductive layer.

12. The touch substrate according to claim 11, wherein each of the plurality of second touch electrodes further comprises a third touch sub-electrode, the third touch sub-electrode is at least partially in the opening peripheral region, and is arranged along an edge direction of the opening, second touch sub-electrodes and/or second connection electrodes that are respectively on two sides of the opening in the first direction are electrically connected through the third touch sub-electrode.

13. The touch substrate according to claim 12, wherein the compensation electrode has a notch on a side away from the opening, the third touch sub-electrode is at least partially in the notch, or the first connection sub-electrode is at least partially in the notch.

14. The touch substrate according to claim 12, wherein the third touch sub-electrode comprises a plurality of first connection portions and a plurality of second connection portions, the plurality of first connection portions are arranged at intervals along the edge direction of the opening, each of the plurality of second connection portions is between two adjacent first connection portions, so that the two adjacent first connection portions are electrically connected through the each of the plurality of second connection portions, the plurality of first connection portions and the plurality of second connection portions are respectively in different conductive layers relative to the base substrate.

15. The touch substrate according to claim 14, wherein the plurality of first connection portions are in the first conductive layer, and the plurality of second connection portions are in the second conductive layer, the first connection portion and the second connection portion are electrically connected through a second connection hole at least penetrating the insulating layer.

16. The touch substrate according to claim 14, wherein the third touch sub-electrode further comprises a third connection portion, the third connection portion is between a second touch sub-electrode and a first connection portion, so that the first connection portion is electrically connected with the second touch sub-electrode and/or the second connection electrode through the third connection portion, and the third connection portion is at least in the first conductive layer and/or the second conductive layer, a width of the third connection sub-electrode in the first direction is less than or equal to a width of the third connection portion in the first direction.

17. The touch substrate according to claim 16, wherein the third connection portion comprises a plurality of signal transmission sub-portions, and the plurality of signal transmission sub-portions are sequentially connected with each other, the plurality of signal transmission sub-portions are respectively in the first conductive layer and the second conductive layer.

18. The touch substrate according to claim 17, wherein each signal transmission sub-portion of the plurality of signal transmission sub-portions extends in a strip shape along a direction parallel to a tangent of an edge of the opening, or extends in a strip shape along a direction perpendicular to the tangent of the edge of the opening, a width of a signal transmission sub-portion in a direction perpendicular to an extension direction of the signal transmission sub-portion is less than a width of a compensation electrode in a direction perpendicular to an extension direction of the compensation electrode.

19. The touch substrate according to claim 12, further comprising at least one dummy electrode, wherein the at least one dummy electrode is in the second conductive layer and on a side of the third touch sub-electrode away from the first functional region.

20. A display panel, comprising a display device and a touch substrate, wherein the display device and the touch substrate are arranged in a stacked manner, the touch substrate comprises:

a base substrate; and a plurality of first touch electrodes and a plurality of second touch electrodes on the base substrate, wherein the plurality of first touch electrodes are arranged along a first direction, and each of the plurality of first touch electrodes extends along a second direction different from the first direction, the plurality of second touch electrodes are arranged along the second direction, and each of the plurality of second touch electrodes extends along the first direction;

each of the plurality of first touch electrodes comprises a plurality of first touch sub-electrodes and at least one first connection electrode, the plurality of first touch sub-electrodes are arranged along the second direction, and a first connection electrode of the at least one first connection electrode is between two adjacent first touch sub-electrodes that are adjacent in the second direction, so that the two adjacent first touch sub-electrodes are electrically connected through the first connection electrode, the plurality of first touch sub-electrodes and the at least one first connection electrode are respectively in different conductive layers relative to the base substrate;

the touch substrate comprises a first functional region and a peripheral region at least partially surrounding the first functional region, the first functional region comprises an opening, and the peripheral region comprises an opening peripheral region at least partially in the opening;

the plurality of first touch sub-electrodes are at least partially in the first functional region and outside the opening peripheral region, and the at least one first connection electrode comprises a first connection sub-electrode, and the first connection sub-electrode is at least partially in the opening peripheral region.

* * * * *

UNITED STATES PATENT AND TRADEMARK OFFICE
CERTIFICATE OF CORRECTION

| | |
|---|---|
| PATENT NO. | : 11,842,019 B2 |
| APPLICATION NO. | : 17/792213 |
| DATED | : December 12, 2023 |
| INVENTOR(S) | : Wang et al. |

It is certified that error appears in the above-identified patent and that said Letters Patent is hereby corrected as shown below:

In the Claims

In Column 33, Line 18 (Line 10 of Claim 7), please change:
"the a compensation electrode..."
To correctly read:
-- a compensation electrode... --

Signed and Sealed this
Fifth Day of March, 2024

Katherine Kelly Vidal
*Director of the United States Patent and Trademark Office*